US009045317B2

(12) United States Patent
Graf

(10) Patent No.: US 9,045,317 B2
(45) Date of Patent: Jun. 2, 2015

(54) METHOD AND SYSTEM FOR ROTATING A CONTAINER, REBAR STRUCTURE OR THE LIKE AND APPARATUSES FOR SUCH ROTATION

(76) Inventor: Rodrigo Graf, Mexico, D.F. (MX)

(*) Notice: Subject to any disclaimer, the term of this patent is extended or adjusted under 35 U.S.C. 154(b) by 333 days.

(21) Appl. No.: 13/410,471

(22) Filed: Mar. 2, 2012

(65) Prior Publication Data

US 2012/0224938 A1 Sep. 6, 2012

Related U.S. Application Data

(60) Provisional application No. 61/449,240, filed on Mar. 4, 2011.

(51) Int. Cl.
*B65G 7/08* (2006.01)
*B66C 13/08* (2006.01)
*B66C 1/10* (2006.01)
*B60P 3/32* (2006.01)

(52) U.S. Cl.
CPC . *B66C 13/08* (2013.01); *B60P 3/32* (2013.01); *B66C 1/101* (2013.01)

(58) Field of Classification Search
CPC ...... B65G 47/248; B65G 47/90; B65G 63/00; B65G 65/00; B65G 2814/0317; B65G 65/23; B65G 47/24; B65G 47/252; B65G 7/02; B65G 7/08; E04G 21/16; E04G 21/14; B66C 1/00; B66C 1/62; B66C 1/223; B66C 1/663; B66C 1/101; B66C 13/08; B60P 7/132; B60P 3/32
USPC ........... 414/758, 421, 425, 10, 816; 294/67.1, 294/67.3, 67.31, 67.32, 81.1, 81.41, 81.51, 294/81.53; 248/83, 139, 141, 511, 519
See application file for complete search history.

(56) References Cited

U.S. PATENT DOCUMENTS

| | | | | |
|---|---|---|---|---|
| 1,638,681 A | * | 8/1927 | Cook | 248/141 |
| 3,137,402 A | * | 6/1964 | Gunn, Jr. | 414/421 |
| 3,531,074 A | * | 9/1970 | Van Dine et al. | 248/141 |
| 3,659,731 A | * | 5/1972 | Carson | 414/421 |
| 3,777,920 A | * | 12/1973 | Wiese | 414/421 |
| 4,496,275 A | * | 1/1985 | Harp | 414/420 |
| 5,755,816 A | * | 5/1998 | Schirmer et al. | 414/768 |
| 5,888,043 A | * | 3/1999 | Jatcko | 414/459 |
| 6,077,028 A | * | 6/2000 | Hassenplug et al. | 414/754 |
| 2008/0105676 A1 | * | 5/2008 | Park | 220/1.5 |
| 2009/0311081 A1 | * | 12/2009 | Ward | 414/425 |

FOREIGN PATENT DOCUMENTS

| | | | | |
|---|---|---|---|---|
| WO | WO 85 00347 | * | 1/1985 | B65G 63/00 |
| WO | WO 2005030622 | * | 4/2005 | B65G 65/30 |

* cited by examiner

*Primary Examiner* — Saul Rodriguez
*Assistant Examiner* — Lynn Schwenning
(74) *Attorney, Agent, or Firm* — Roylance, Abrams, Berdo & Goodman, L.L.P.

(57) ABSTRACT

The present invention discloses a method of rotating a metallic structure for construction in an X axis. The method of present invention allows rotating structures such as rebar or metallic structures like containers to create habitable structures such that each of the walls of the container or the rebar structure, are all at some point facing the floor. That is, each of the walls have a downwardly facing direction at some point of the rotation.

The structures disclosed are mated to a bar with an arm, the bar being fastened to the container from an upper end of a first corner of the container to a lower end of a second corner opposite to the first corner.

14 Claims, 39 Drawing Sheets

METHOD AND SYSTEM FOR ROTATING A CONTAINER, REBAR STRUCTURE OR THE LIKE AND APPARATUSES FOR SUCH ROTATION

CROSS-REFERENCE TO RELATED APPLICATIONS

This application claims benefit from provisional application No. 61/449,240, filed Mar. 4, 2011. This application is related to pending application No. 61/317,392 filed on Mar. 25, 2010. This application is also related to pending application Ser. No. 12/427,887 filed on Apr. 22, 2010, claiming benefit from provisional application No. 61/046,961 filed on Apr. 22, 2008.

FIELD OF THE INVENTION

The present invention is related with pre-fabricated structures, such as semi-trailer or shipping containers, as well as with rebar structures or metal structures whose original structure will be modified to provide livable structures made with cement or concrete. More specifically, the present invention is related with a method for constructing habitable structures from container, rebar structures or metal structures, and a method of rotating a container, rebar structure or metal structure for constructing such habitable structures. Even more specifically, the present invention is directed to methods and apparatuses for rotating containers, rebar structures or metal structures, such as a crane, gear or piston systems for facilitating rotation containers, rebar structures or metal structures and hence facilitating the method of construction of such habitable structures from container, rebar or metal structures.

DESCRIPTION OF RELATED ART

Rotation methods for prefabricated structures, such as semi-trailer containers, shipping containers, rebar structures or the like is known in the art.

For example, WO 2010/066983 discloses a device including a crane sized so as to be able to seize the container by an anchor point and lift the container along the vertical axis thereof, at least two retractable brushes arranged symmetrically relative to the vertical axis of the container, and a rotary bearing arranged between the crane and the anchor point.

Japanese publication No. 2008143639 discloses a hoisting device tilt rotating/swiveling apparatus for a crane.

Chinese publication No. 2918355 discloses an anti-rolling hoisting mechanism with eight ropes for container cranes.

Chinese publication No. 2931431 discloses a anti-roll hoisting mechanism for a container crane comprising a drum, a steel wire rope, upper and lower pulley block, and a lifting frame.

CN publication No. 200946047 discloses a container conveying carriage and conveying system.

Chinese publication No. 20070228 discloses an expandable spreader for high pedestal jib crane.

Chinese publication No. 2711122 discloses a sling for lifting a container for automatically unloading.

U.S. Pat. No. 3,713,554 discloses a container-dumping apparatus which is particularly suitable for use with citrus and the like. The apparatus includes a lift bar which is rotatably mounted on the end of a lift device such as a crane or boom.

Finally, British publication No. 1110650 discloses a jib crane for the loading and unloading of containers of uniform size having a pivoted jib, which is rotatable about a vertical axis and has a loading member suspended by two pairs of cables which cross each other between the loading member and the top of the jib.

All of the above prior art documents disclose methods for rotating containers in a Y axis, preferably shipping containers and cranes for rotating such containers. That is, in the above publications, the container is always kept with the lower wall facing in a downwardly direction, and is never rotated in such a manner that the lower wall faces other than a downwardly direction. However, none of the prior art documents disclose a method for rotating containers, rebar structures or the like in an X axis and a crane, gear or piston structure for facilitating such rotation of containers, rebar or metal structures. That is, none of the above publications disclose a rotation method in which a wall, other than the lower wall of the container, rebar structure or the like, such as the side walls or the upper wall of the container, rebar structure or the like face a downwardly direction. In fact all the above publications dissuade a technician in the field from carrying out a rotation in which a wall, other than the lower wall, is facing a downwardly direction.

BRIEF SUMMARY OF THE INVENTION

The invention refers to a construction method with new or used containers, preferably shipping containers or with traditional rebar structures (reinforcement bars) for prefabricated buildings or metal structures for prefabricated buildings, a method for rotating in an X axis such containers, rebar or metal structures by means of their front and back walls, and apparatuses for such rotation.

A method of making a habitable structure from a container or rebar structure such as that disclosed in pending U.S. application Ser. No. 13/051,408 filed on Mar. 18, 2011 or MX application No. MX/a/2011/003197 filed on Mar. 24, 2011 and corresponding to the same application may be optionally carried out. Therefore, the Graf reference is incorporated by reference, however, the extent of some statements might be considered inconsistent with the patenting of this invention, such statements are expressly not considered as made by the applicant of the present invention.

The present invention particularly discloses a crane, gear or piston structure for rotating a container, rebar or metal structure in an X axis, the related parts of such crane, gear and piston structure and a method for rotating such container, rebar or metal structure in an X axis with said crane and its related parts, as well as with the alternate gear structure or said piston structure. Such rotation will facilitate the construction of habitable structures from said containers, rebar structures or the like. Compared to the prior art, which discloses rotating containers in regards to a Y axis, the present invention is directed to a method of rotating the container, rebar or metal structure with a crane and its related parts, a gear structure or a piston structure in regards to an X axis. That is, the purpose of the present invention is rotating the container, rebar or metal structure such that each of the walls of the container or sides of the rebar or metal structure, that is the lower wall, the side walls and the upper wall of the container or rebar or metal structure are all, at some point, and when rotation is carried out, facing the floor or more specifically, a bed so that cement or concrete may be poured to said walls or sides. That is, the container, rebar or metal structure are rotated so that each of the walls, except for the front or back wall, all have at some point a downwardly facing direction.

A bed is provided, which has a substantially flat surface, having an area greater than the wall—lower, upper or sidewalls of the container—or side area of the container, rebar or metal structure and the substantially flat surface being bound by front, back and side walls provided in the bed which abut with the substantially flat surface. The front, back and side walls of the bed may be moved in regards to the substantially flat surface so as to increase or decrease the area size of the bed. The front, back and side walls of the bed abut the flat surface and hence seal with regards to the substantially flat surface. The bed may be raised and lowered according to the specific needs of the container, rebar structure or the like. The bed may be raised or lowered by jacks or similar devices known in the art, wherein at least one jack or similar device is preferably positioned in each corner of the bed, in accordance to the specific embodiments of the invention.

In a first embodiment two cranes are placed, each on one end of the container, rebar structure or the like, that is, the front end and the back end, and thus, when an arm of a bar is set to rest on an opening of a cross-bar, and when a jib hook or hoist rope is released from the side openings of twist locks, corner castings or hollow structure of the container, rebar or metal structure, said container, rebar or metal structure may be freely rotated in an X axis, hence the cross-bar serves as a balance beam for the rotation of the container, rebar or metal structure. Therefore, a swinging motion may be conveyed manually or by means of an engine to the container, rebar or metal structure so as to sway the container, rebar or metal structure and eventually cause the container, rebar or metal structure to rotate so that different walls, such as the side, upper or lower walls, may be facing the floor or bed when the container, rebar or metal structure is rotated, for example from a first wall which is initially facing the floor or bed, such as the lower wall to a second wall to be facing the floor or bed after rotation, such as a first side wall. That is, the container, rebar or metal structure is rotated so that each of the walls, lower, upper and side walls face a downwardly direction during some point of the rotation. The bed is then raised so that the wall facing the floor or the bed of the container, rebar or metal structure is within the walls provided by the bed. The container, rebar or metal structure is not rested over the bed, rather simply hung by the crane or the planetary gear system keeping a gap between the substantially flat surface of the bed and the container, rebar or metal structure wall, more specifically in the case of the containers, leaving a gap between the corners of the container which are generally protruded with regards to the rest of the container wall and the substantially flat surface. Cement or concrete may then be poured to said container wall or rebar side which is proximate to the bed.

A second embodiment is provided by gear structures, preferably a planet gear structure, in which the gear structure substitutes the crane, the jibs and the hooks.

Optionally, in any of the two above embodiments, an engine may be connected by means of gears or alternate means, such as sprockets to the arm of the bar. The engine may be powerful enough to convey the torque necessary to rotate the container or rebar structure in said X axis.

A third embodiment is provided by a piston machine which causes the rotation of the container, rebar or metal structure. The third embodiment is preferably carried out with an engine connected by means of gears or alternate means, such as sprockets to the piston and cylinder thereof.

Once all the side walls have faced the floor or bed and the bed has been raised and lowered so that cement or concrete may be poured in the wall facing the floor or bed, the container, rebar or metal structure is then raised, the bed is lowered and removed from below the container, rebar or metal structure, so as to unfasten the arm with the cross-bar from the container, rebar or metal structure, and the container, rebar or metal structure may be lowered to the floor.

DETAILED DESCRIPTION OF THE INVENTION

Figure 1:
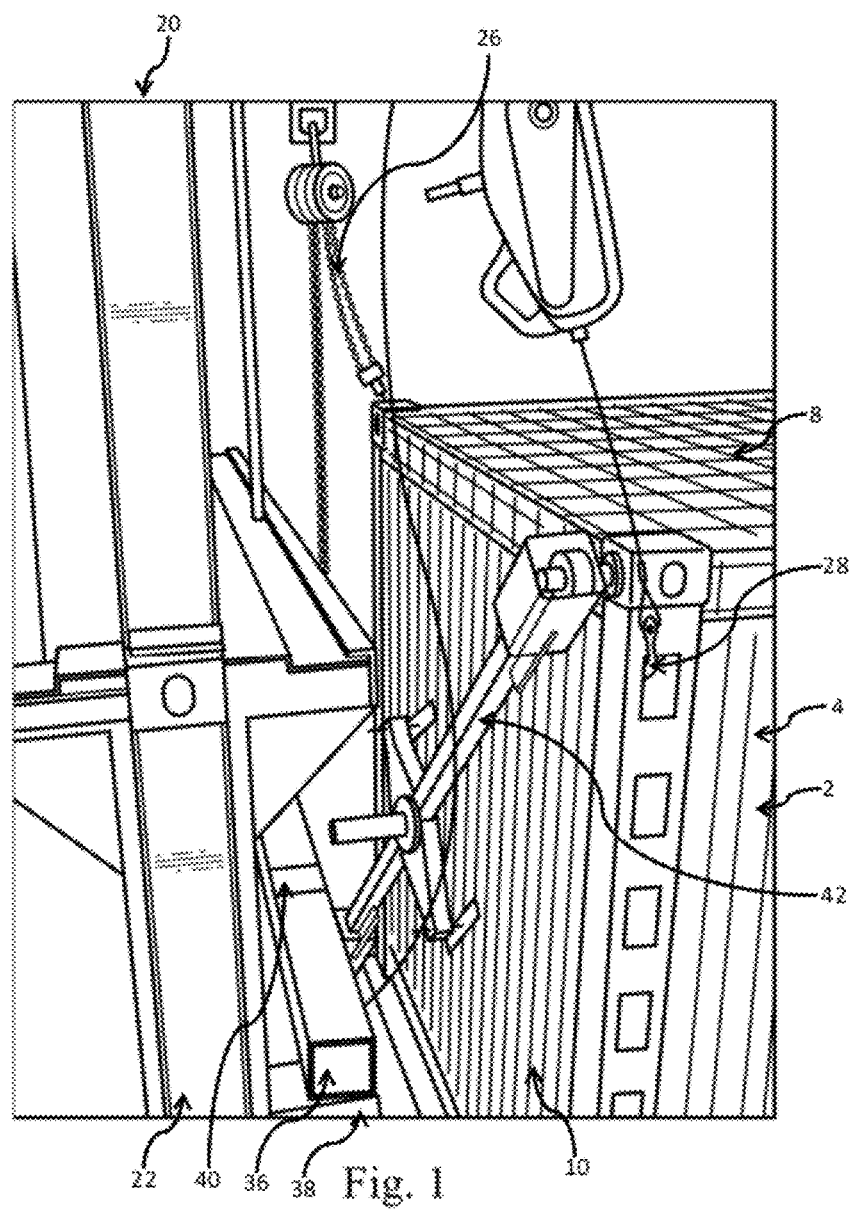
FIG. 1 is an upper conventional perspective view of a front or back end of the container, the bar and its arm, the housing of the bar, the boom, the cross-bar and the opening of said cross-bar.

The invention refers to a construction method with new or used containers 2, preferably shipping containers, as well as traditional rebar structures (reinforcement bars) of prefabricated buildings or metallic structures of prefabricated buildings, a method for rotating said containers, rebar structures or the like by means of their front and back walls, and apparatuses such as cranes 20, planetary gear structure 70, or a piston machine structure 140 for such rotation.

A method of making a habitable structure from the container 2 or rebar structure such as that disclosed in pending application Ser. No. 13/051,408 filed on Mar. 18, 2011 or MX application No. MX/a/2011/003197 filed on Mar. 24, 2011 and corresponding to the same application may be optionally carried out. Therefore, the Graf reference is incorporated by reference, however, the extent of some statements might be considered inconsistent with the patenting of this invention, such statements are expressly not considered as made by the applicant of the present invention.

The present invention particularly discloses a crane 20, gear structure 70 or piston machine structure 140 for rotating a container 2, rebar structures or the like in an X axis, the related parts of such crane, gear structure and piston machine structure and a method for rotating such container, rebar structures or the like in an X axis with said crane and its related parts, as well as with the alternate gear structure or the alternate piston machine structure. Such rotation will facilitate the construction of habitable structures from said containers 2, rebar structures or the like. Compared to the prior art, which discloses rotating containers in regards to a Y axis, the present invention is directed to a method of rotating the container 2, rebar structures or the like with a crane and its related parts, a gear structure or a piston machine structure in regards to an X axis. That is, the purpose of the present invention is rotating the container 2, rebar structures or the like such that each of the side 4, lower 6 and upper 8 walls of the container 2, or sides, lower and upper parts of the rebar or metal structure, are all at some point, and when rotation is carried out, facing the floor or more specifically, a bed 14 that is each of the walls above disclosed having a downwardly facing direction at some point of the rotation, so that cement or concrete may be poured to said walls or sides.

The bed 14 has a substantially flat surface 16 having an area greater than the upper 8, lower 6 or side 4 walls of the container 2, rebar structures or the like. The substantially flat surface 16 being bound by front, back and side walls 18 which abut with the substantially flat surface 16. The front, back and side walls 18 of the bed 14 may be moved so as to increase or decrease the boundary area of the substantially flat surface defining the bed in which the container 2, rebar structures or the like will be nestled in. A gap between the substantially flat surface and the container, rebar structures or the like will be left so that the cement or concrete may be poured and cured in both sides of the container, rebar or metal structure walls, that is in the outer side of the wall and in the inner side of the wall. The front, back and side walls 18 abut the substantially flat surface 16 in such a manner that said walls 18 seal with regards to the substantially flat surface 16. The bed 14 may be raised and lowered according to the specific needs of the rotation method. The bed 14 is raised or lowered by jacks 122 or similar devices known in the art, wherein at least one jack 122 or similar device is preferably positioned in each corner of the bed 14.

As stated above, the present invention is essentially aimed for a container, rebar structures or the like rotation method along the X axis of such container, rebar structures or the like, such that the side walls, the lower wall and the upper wall may face the floor or the bed when the container, rebar structures or the like is rotated. At least three embodiment examples of how the container, rebar structures or the like may be rotated in its X axis are disclosed below, however, it should be understood from the same that they are examples of how such container, rebar structures or the like may be rotated, and are not limited to said examples only.

It should further be understood from the following specification that the following specification is made in general for metallic structures for construction of habitable structures, such as container and rebars, and should not be construed as limited only to containers or rebar structures.

First Embodiment

Figure 2:
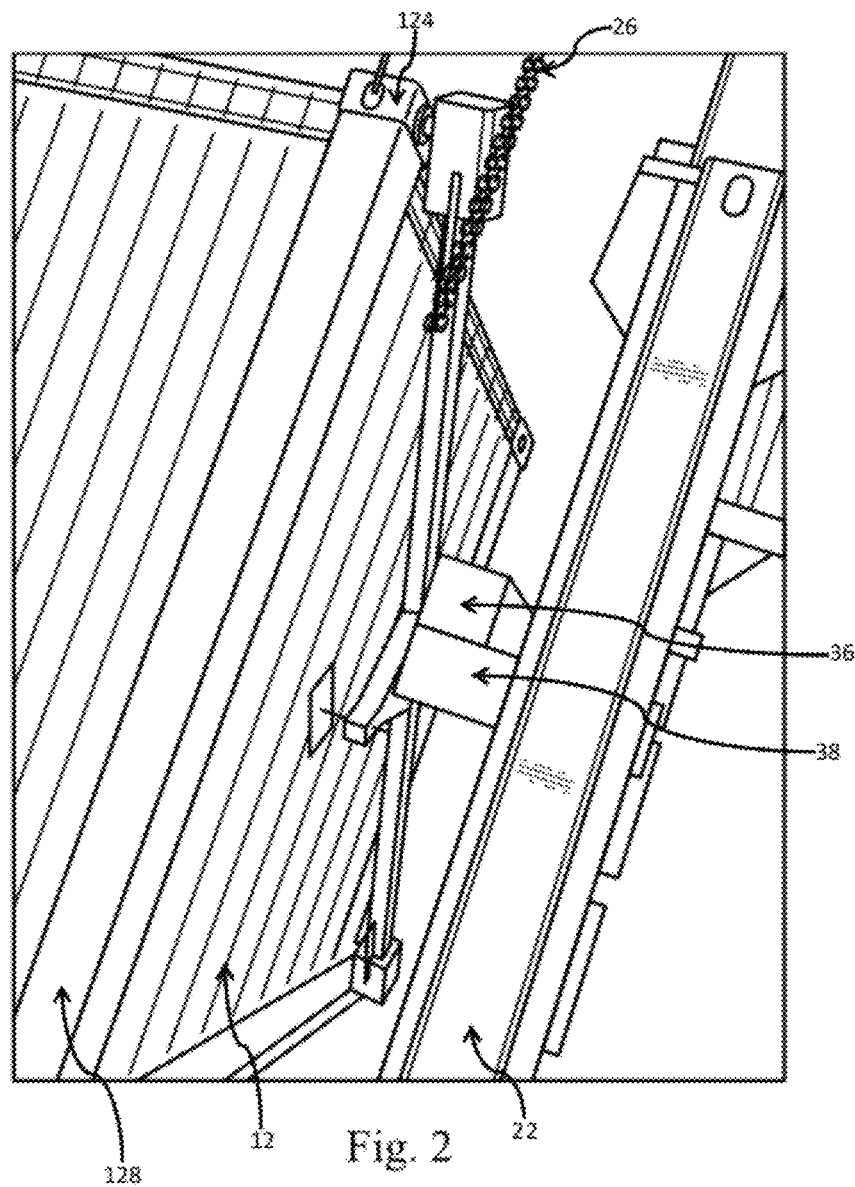
FIG. 2 is a lower conventional perspective view of a front or back end of the container, the bar, the housing of the bar, the boom, the support and the cross-bar.
Figure 3:
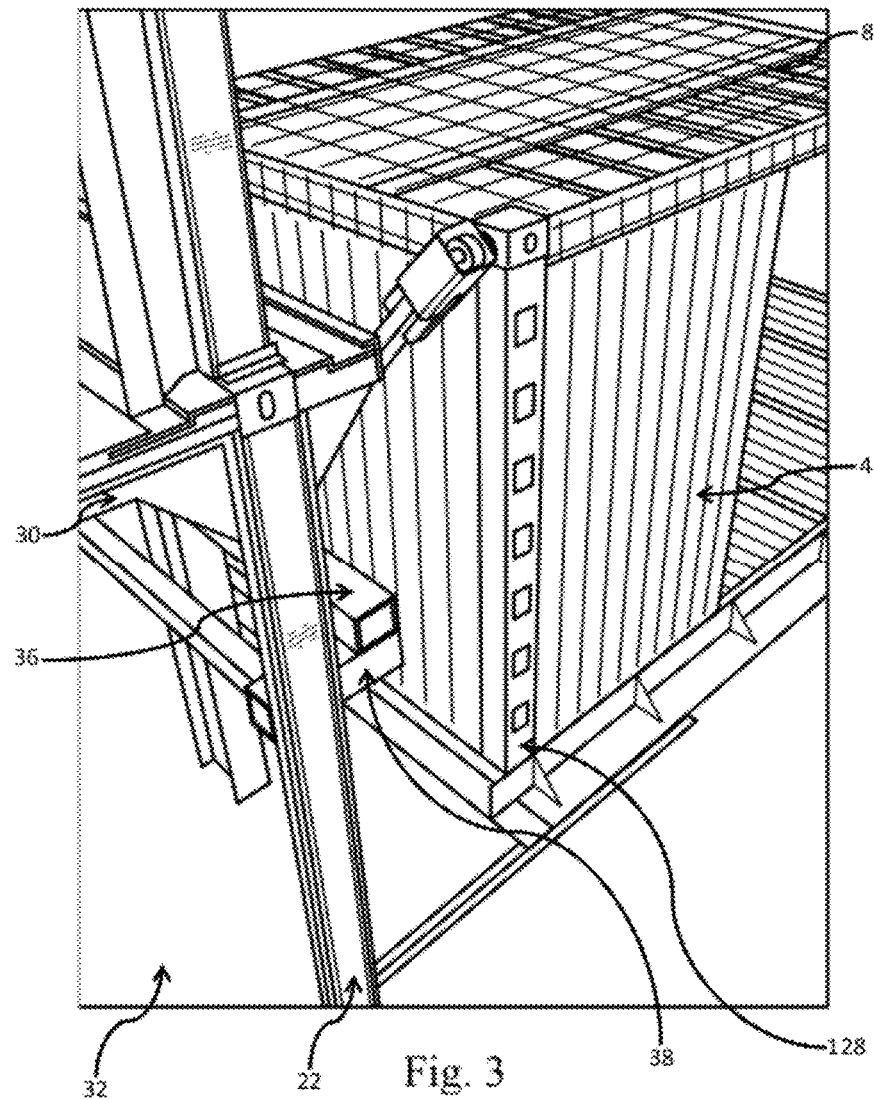
FIG. 3 is an upper conventional perspective view of a container, the bar, the housing of the bar, the boom, the support, the cross-bar and the second cross-bar.
Figure 4:
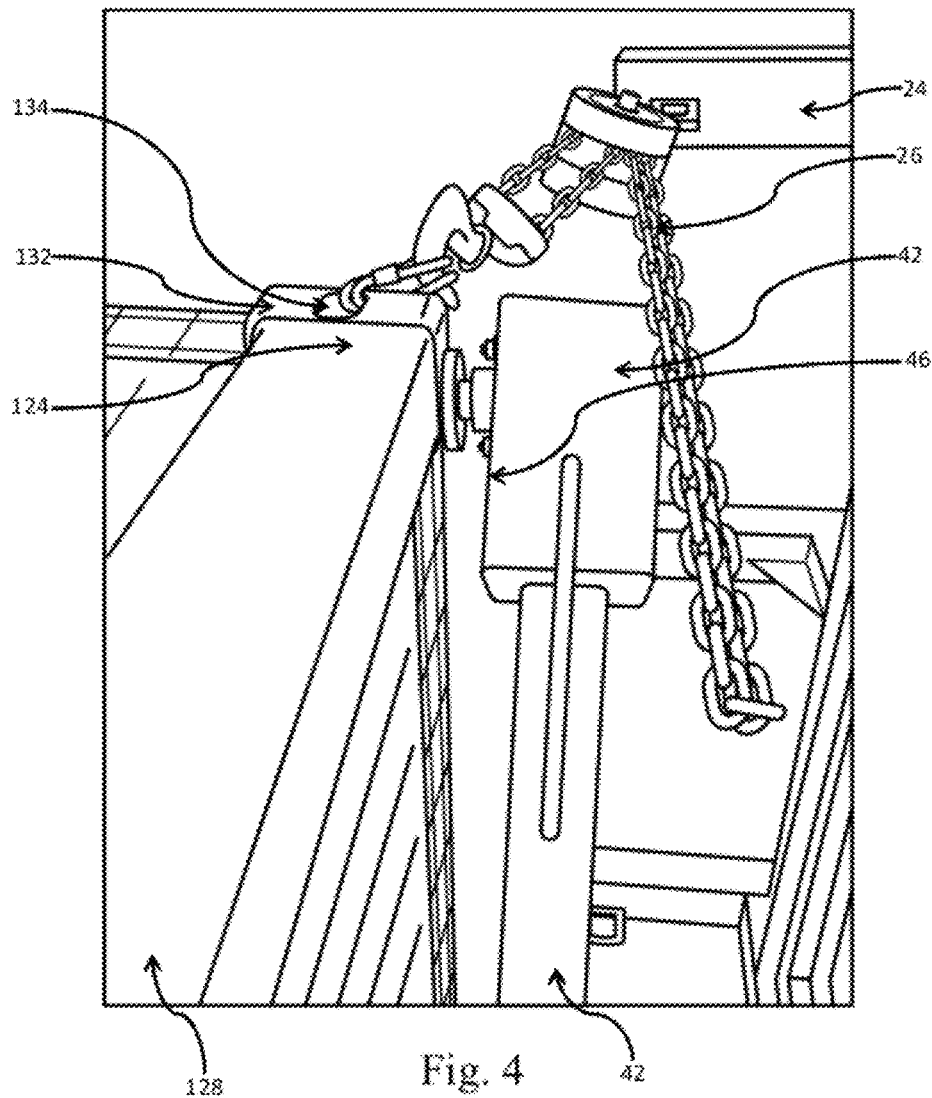
FIG. 4 is a lower conventional perspective view of a corner of the container, an end of the bar, the housing of said end of the bar, the jib, the hoist rope, the jib hook and a second hoist rope fastened to one of the twist locks of the container.
Figure 5:
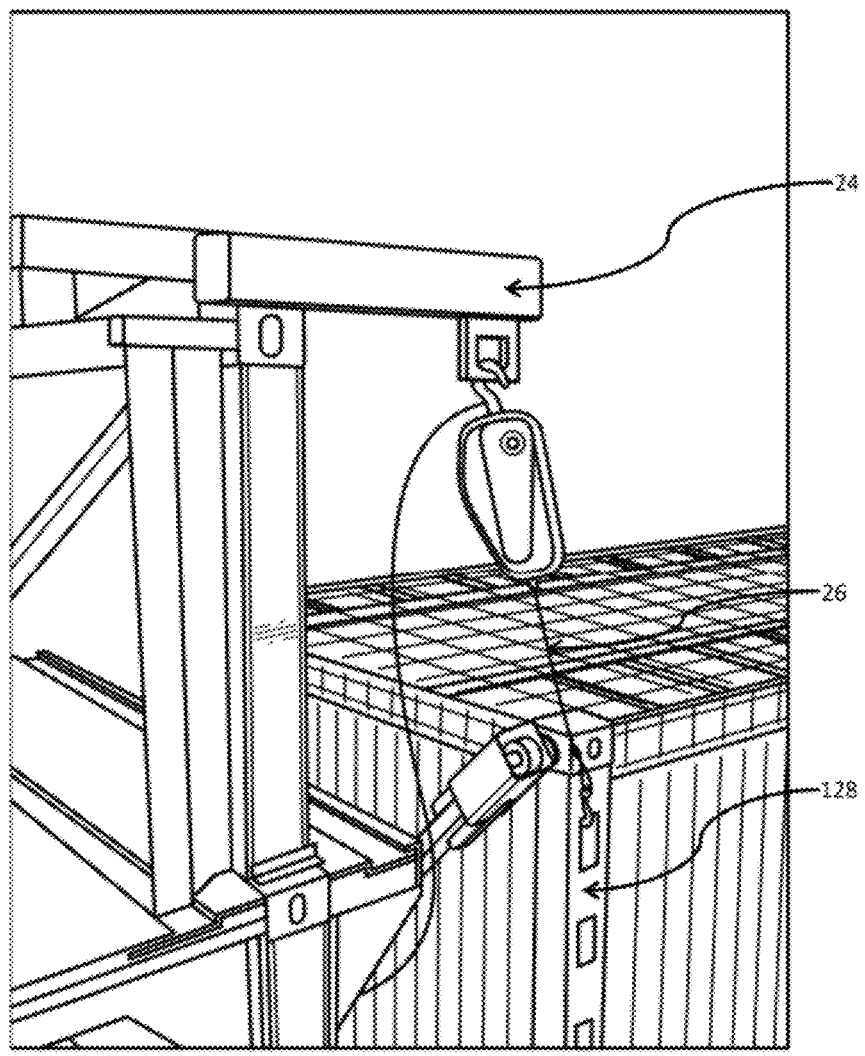
FIG. 5 is an upper conventional perspective view of a corner of the container, an end of the bar, the housing of said end of the bar, the jib, the jib hook and a hoist rope to be fastened to one of the twist locks of the container.
Figure 6:
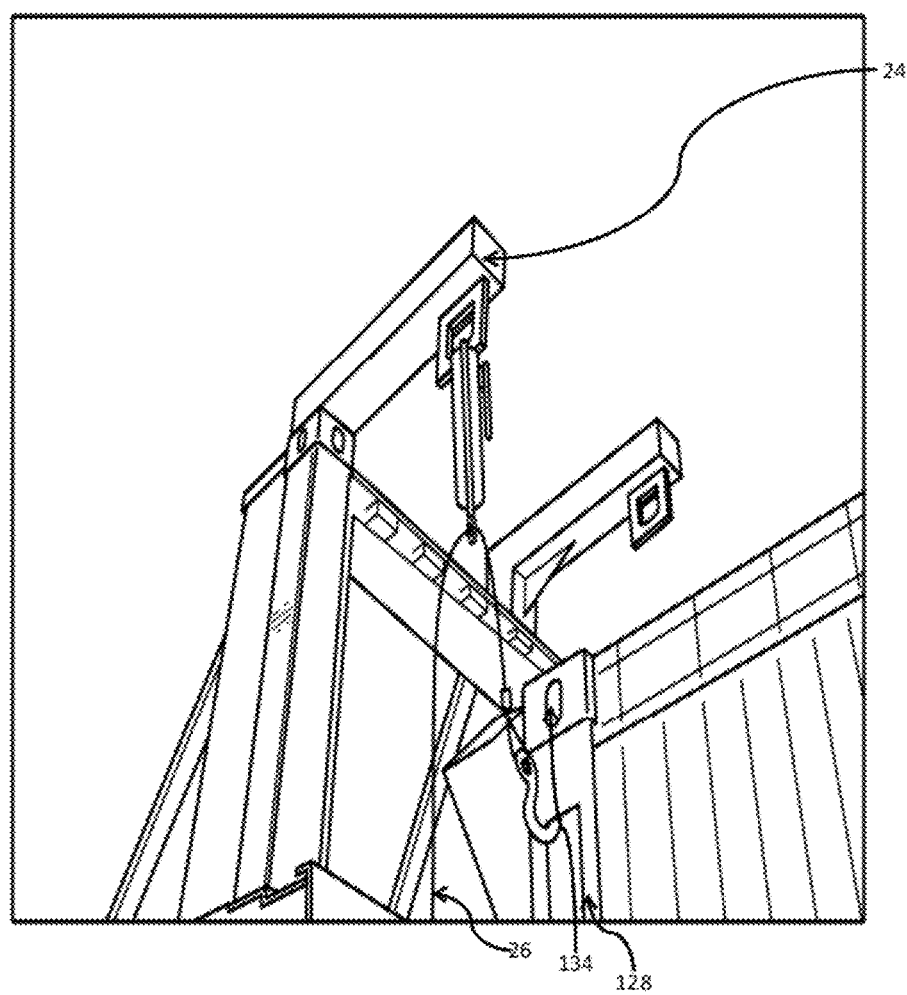
FIG. 6 is a lower conventional perspective view of a corner of the container, an end of the bar, the housing of said end of the bar, the booms, the jibs, the hoist rope, the jib hook and a second hoist rope fastened to one of the twist locks of the container.
Figure 7:
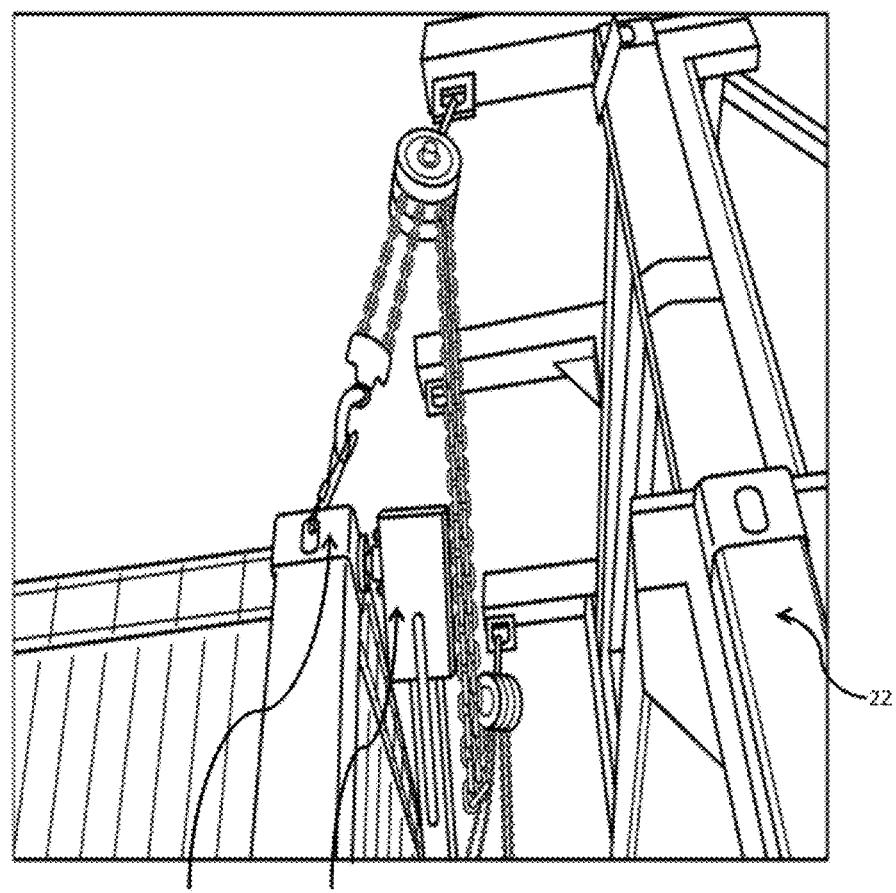
FIG. 7 is a lower view of the two jibs.
Figure 8:
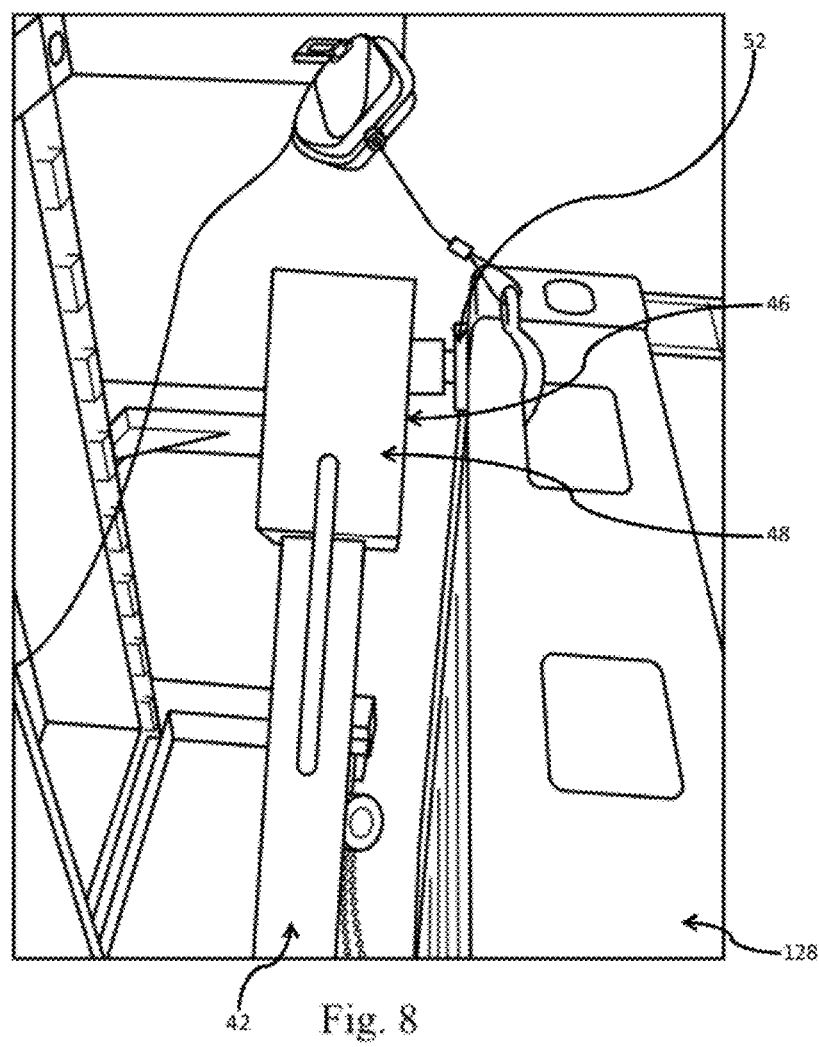
FIG. 8 is a detailed view of the hoist rope fastening with the twist lock in the upper end corner of the container.
Figure 9:
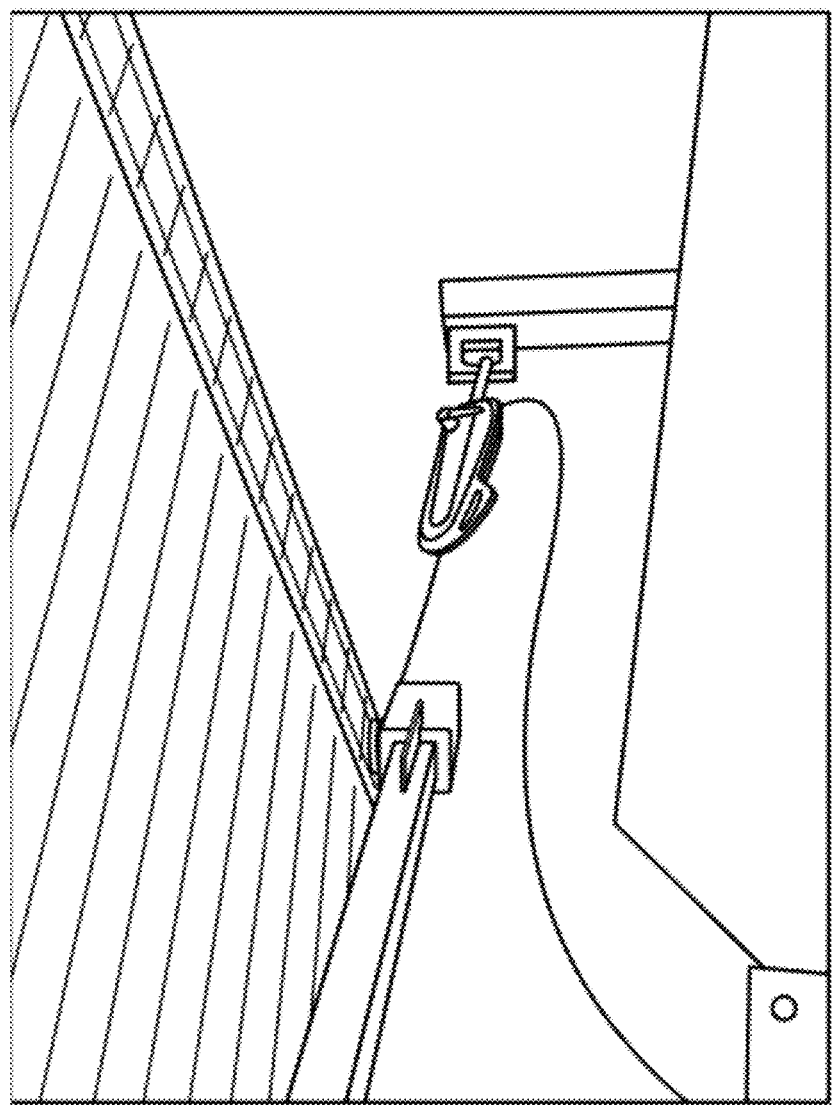
FIG. 9 is a lower conventional perspective view of the jib hooks and the hoist rope.
Figure 10:
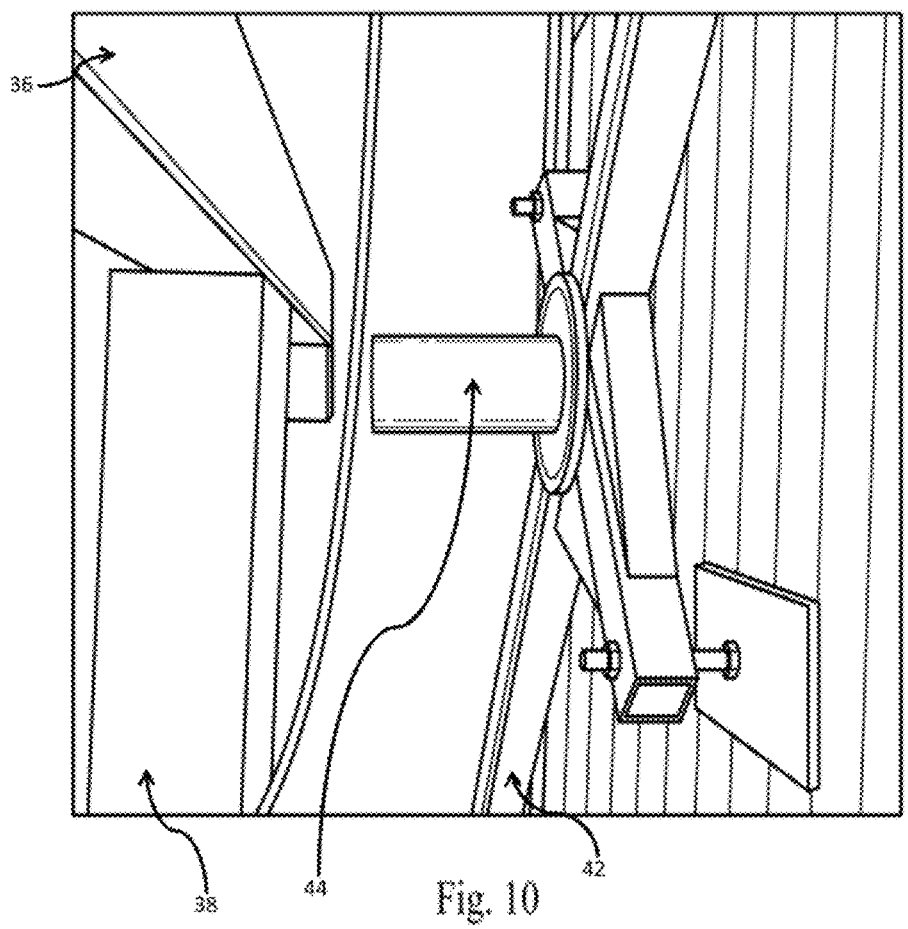
FIG. 10 is a side view of the arm of said bar in the central portion of said bar.
Figure 11:
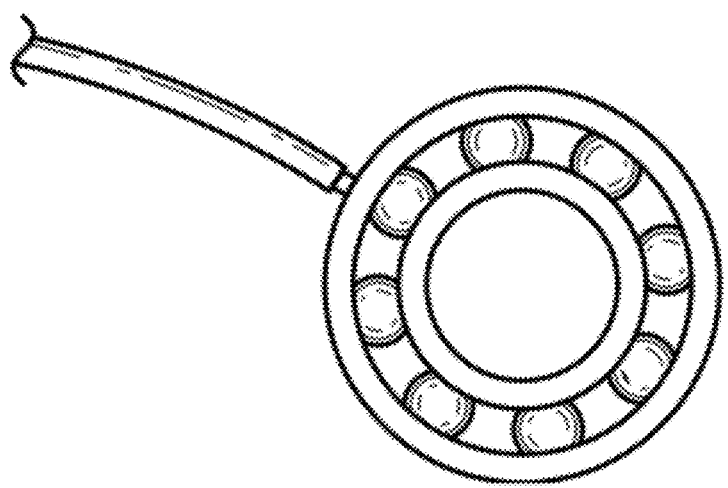
FIG. 11 is a front view of the ball bearing assembly.
Figure 12:
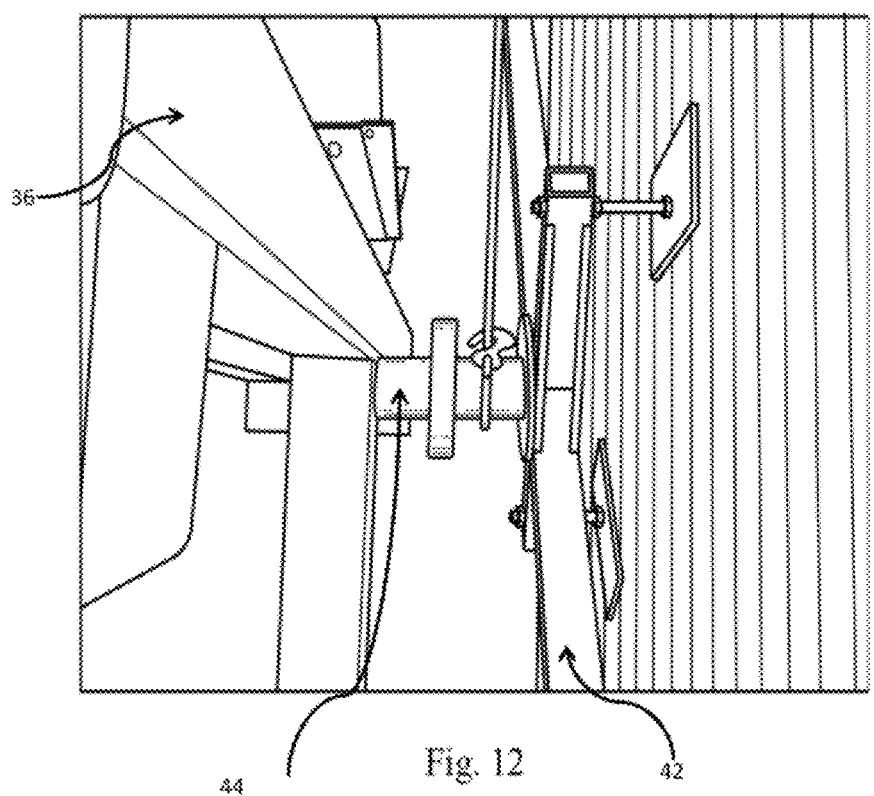
FIG. 12 is a side view of the arm of said bar in the central portion of said bar, wherein the ball bearing assembly is fixed with said arm.
Figure 13:
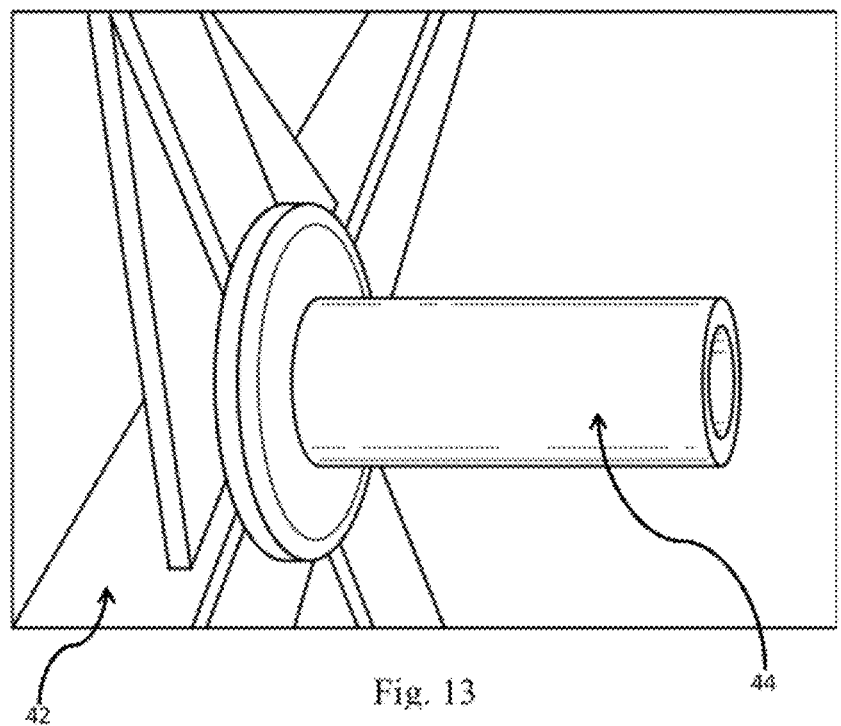
FIG. 13 is a detailed view of the arm of said bar.
Figure 15:
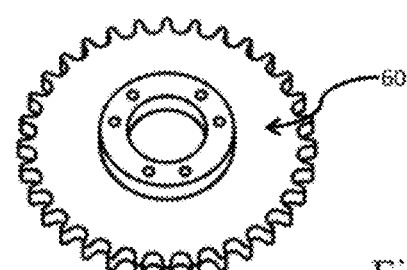
FIG. 15 is a sprocket which will be connected between the engine and the arm of said bar.
Figure 14:
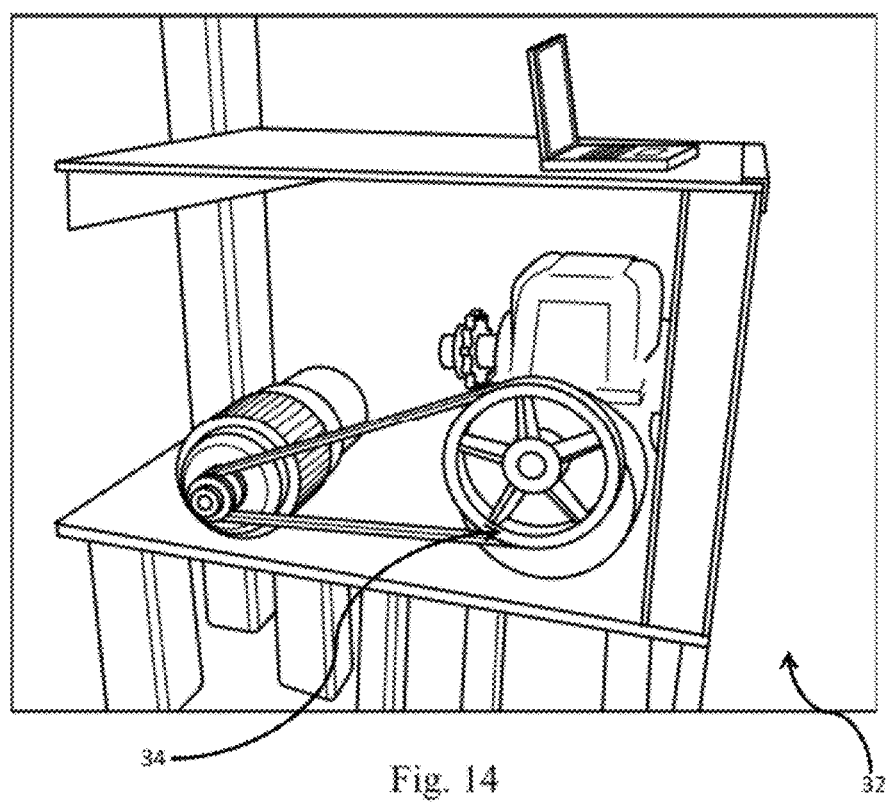
FIG. 14 is a side view of the engine within the housing provided by the booms and beams.
Figure 16:
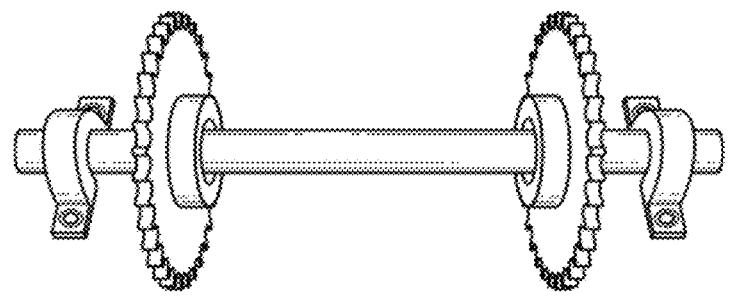
FIG. 16 is a gear and a drive shaft which will be connected between the engine and the arm of said bar.
Figure 17:
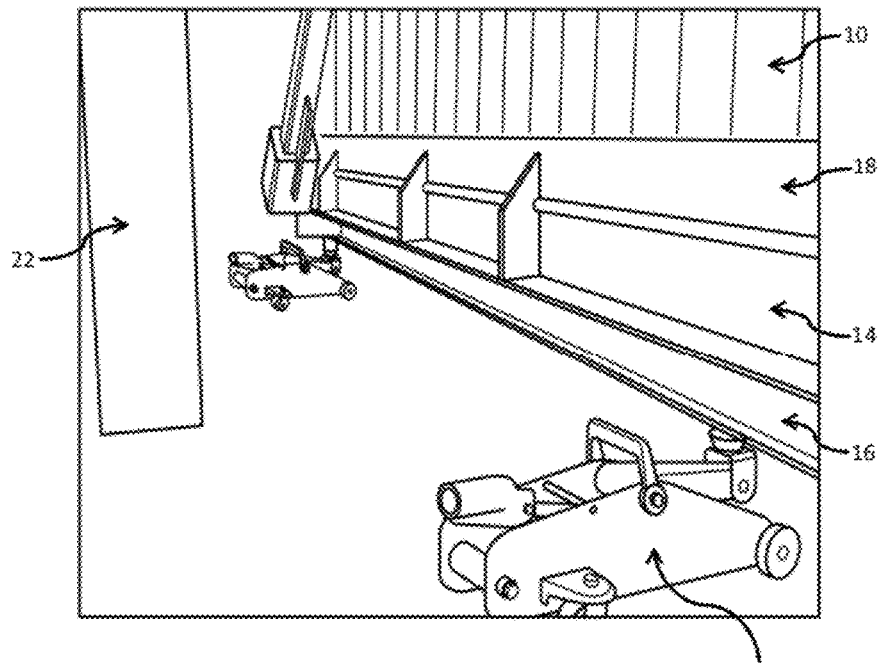
FIG. 17 shows a view wherein the jacks lift the bed from a lowered position to a raised position.
Figure 18:
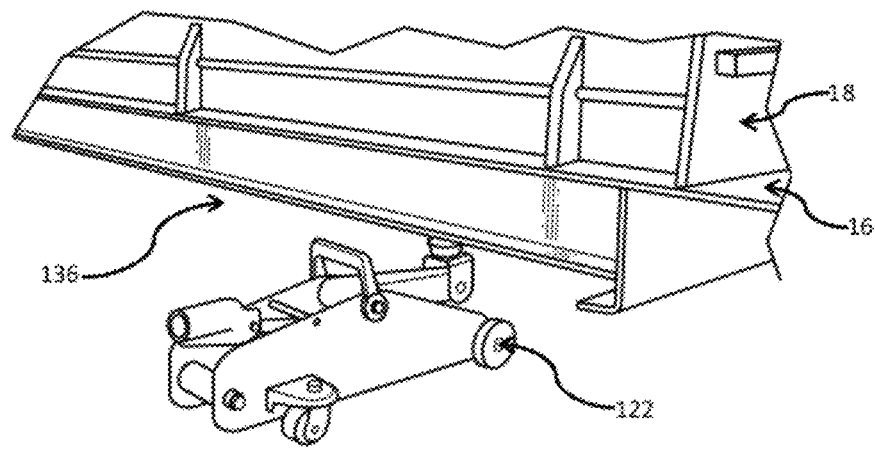
FIG. 18 is a detailed view showing the jacks lift the bed from a lowered position to a raised position.
Figure 19:
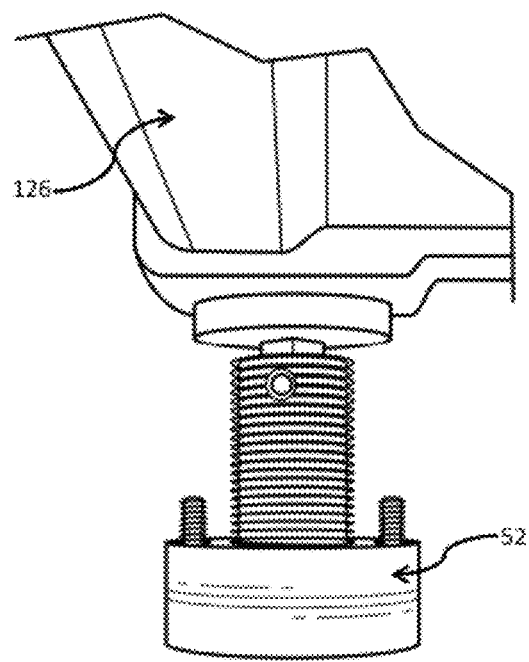
FIG. 19 shows an upper view of the fastener, comprising a body, a head and its complementary wind.
Figure 20:
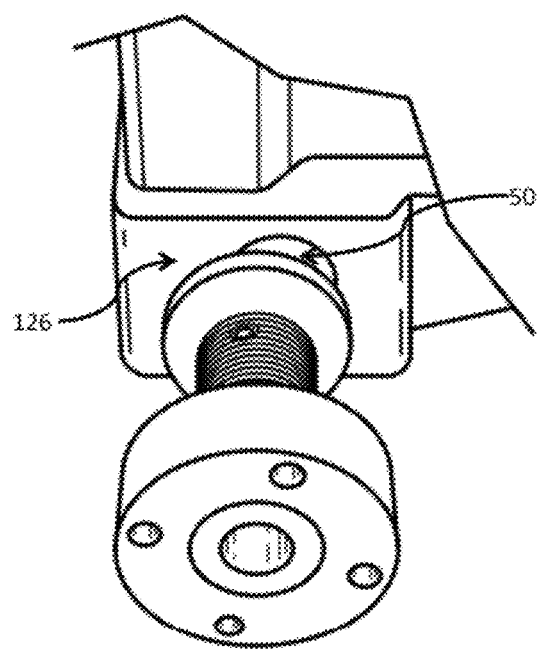
FIG. 20 shows an upper view of the fastener and its disposition with the container.
Figure 21:
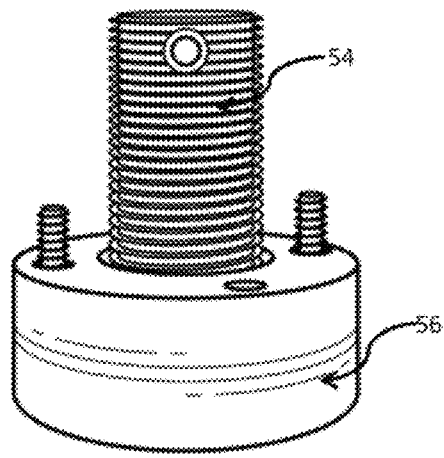
FIG. 21 shows an upper view of the fastener.
Figure 22:
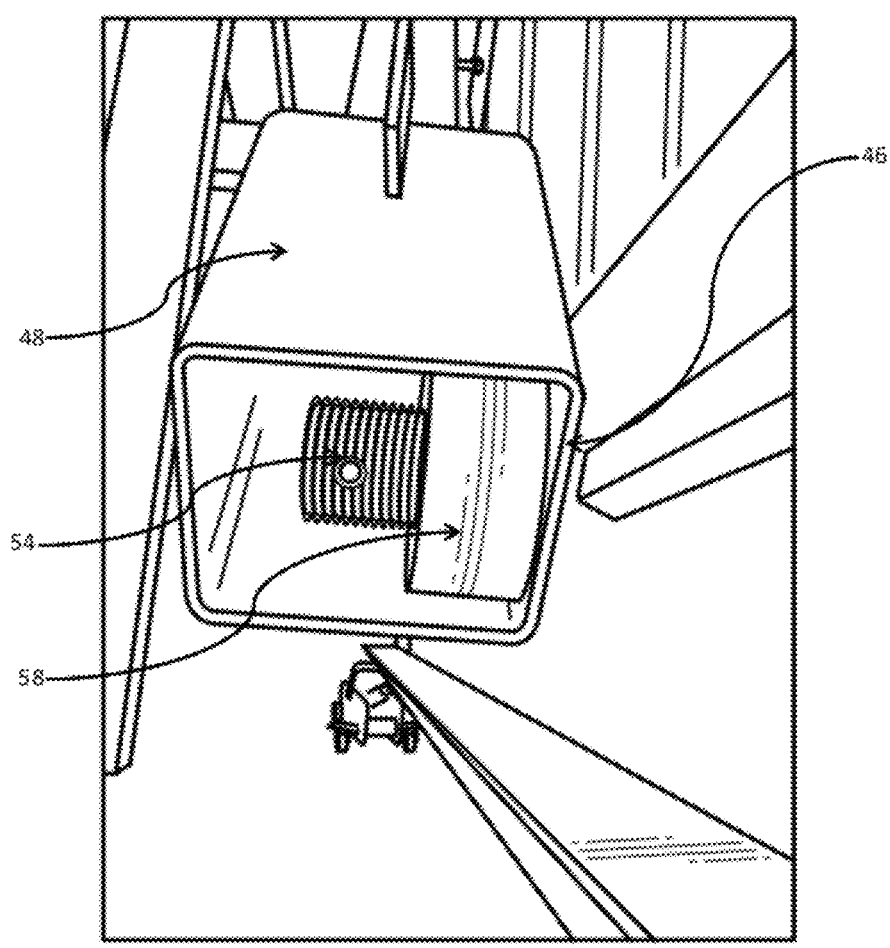
FIG. 22 shows a detailed view of the relation between the housing of the bar, the fastener and the container, wherein the fastener is within the housing of the bar and the body of the container crosses the opening in the wall of the housing proximate to the container and the front opening of the twist lock that is proximate to the wall of the housing.
Figure 23:
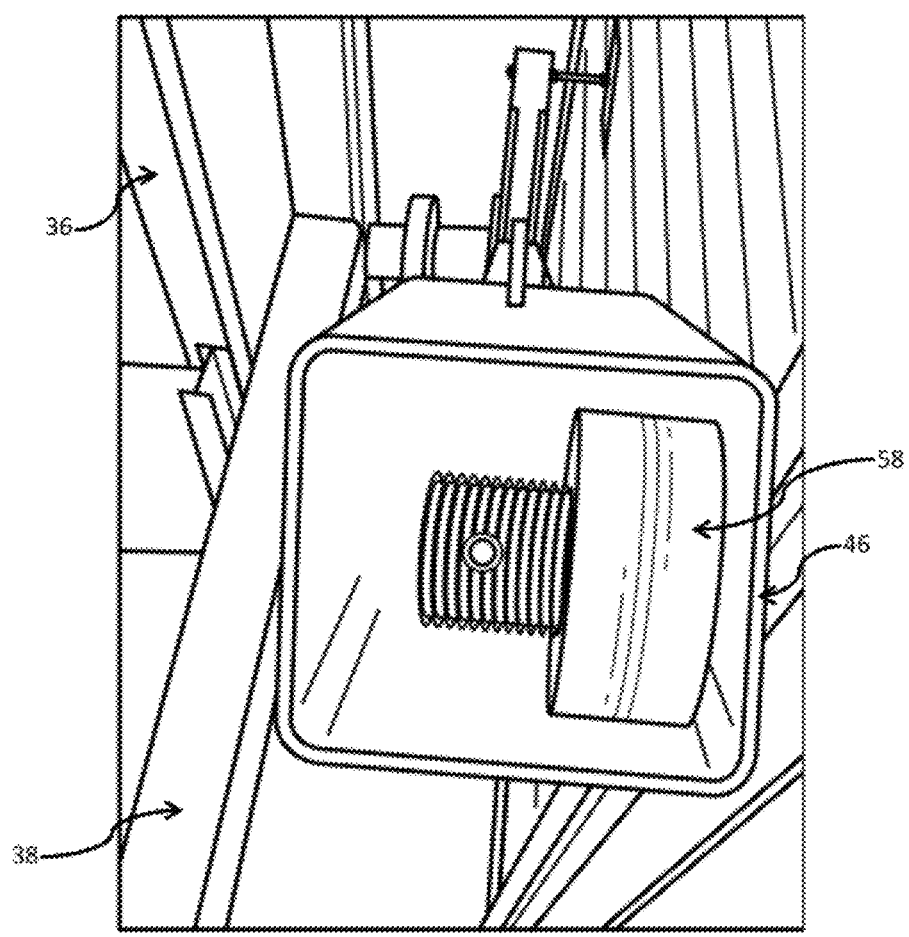
FIG. 23 shows a detailed view of the relation between the housing of the bar, the fastener and the container, wherein the fastener is within the housing of the bar and the body of the container crosses the opening in the wall of the housing proximate to the container and the front opening of the twist lock that is proximate to the wall of the housing.
Figure 24:
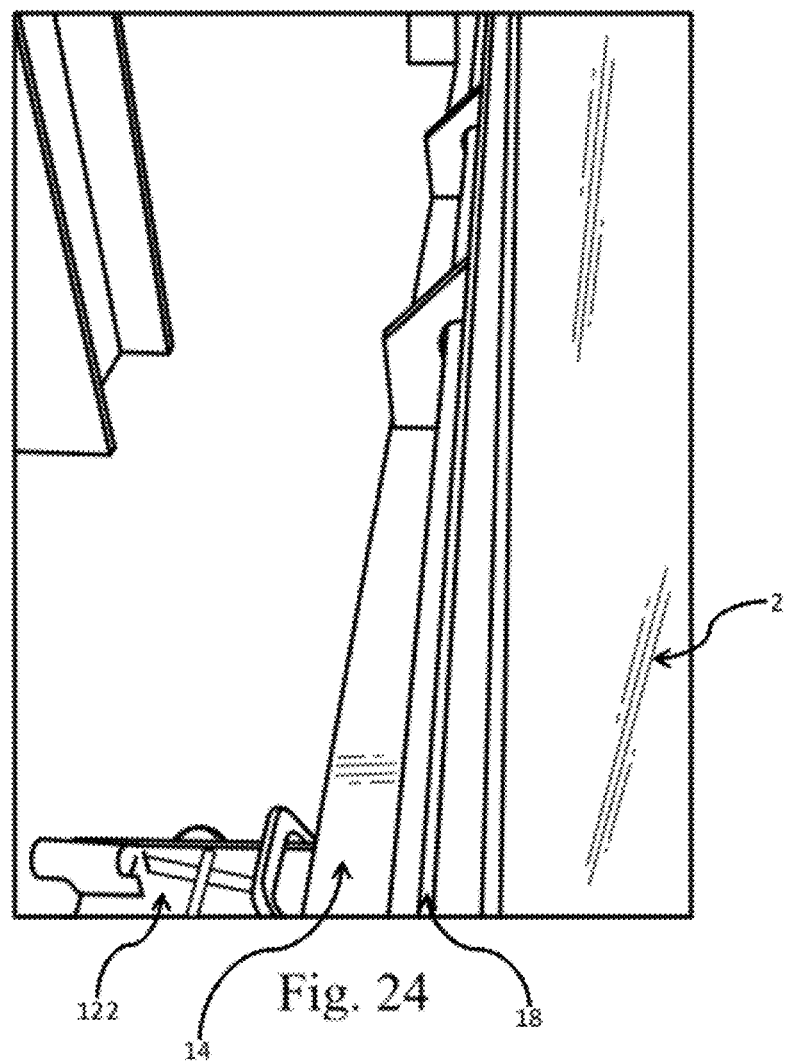
FIG. 24 shows the bed, the separation between the wall and the bed and a wall of the container.
Figure 25:
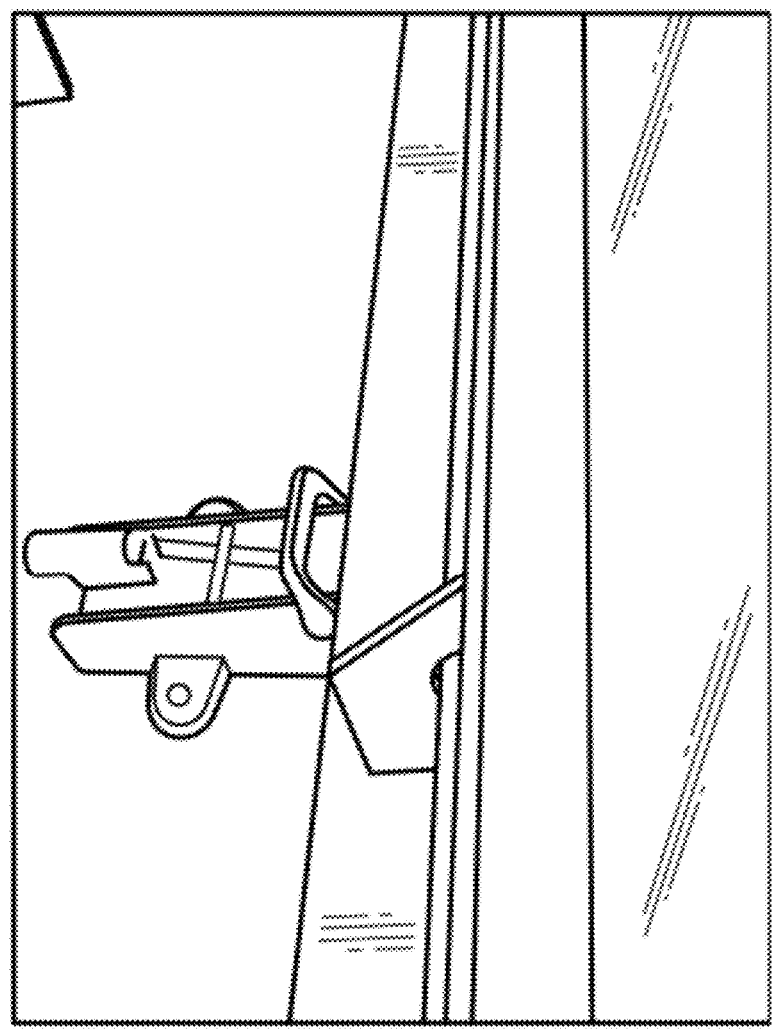
FIG. 25 shows the bed, the separation between the wall and the bed and a wall of the container.
Figure 26:
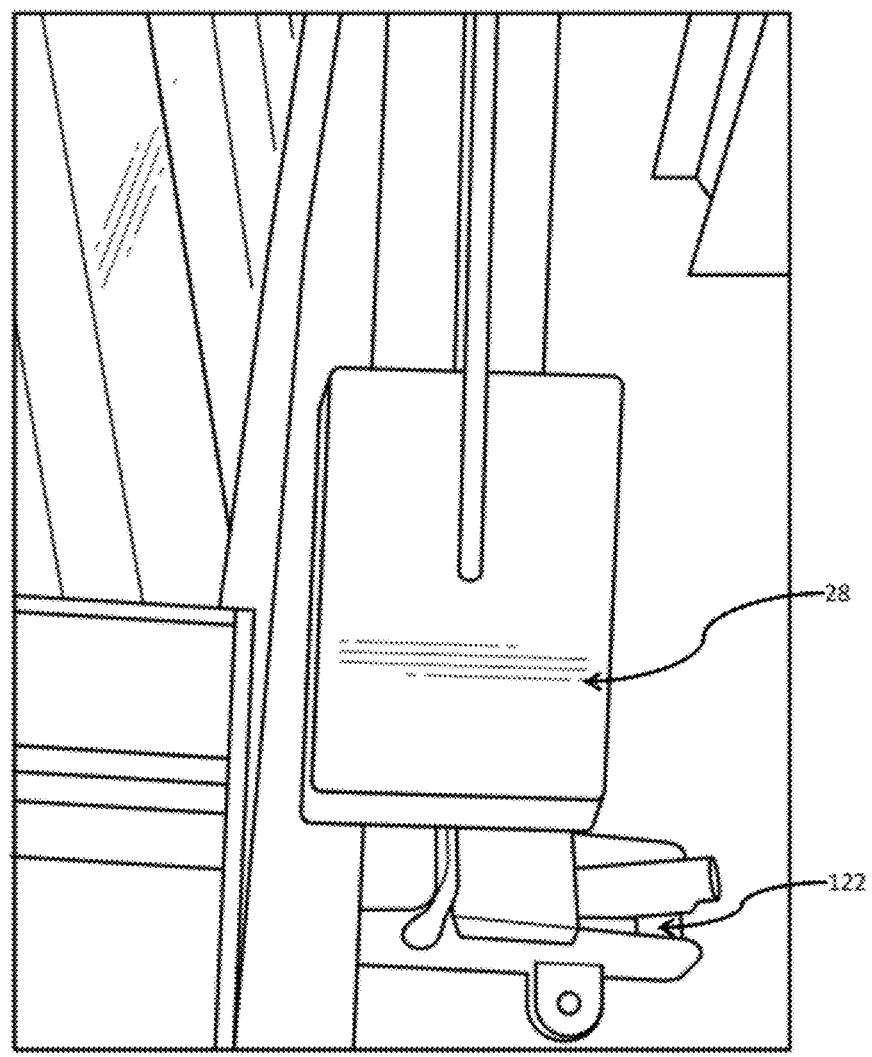
FIG. 26 shows a corner of the bed as well as a housing of the bar.
Figure 27:
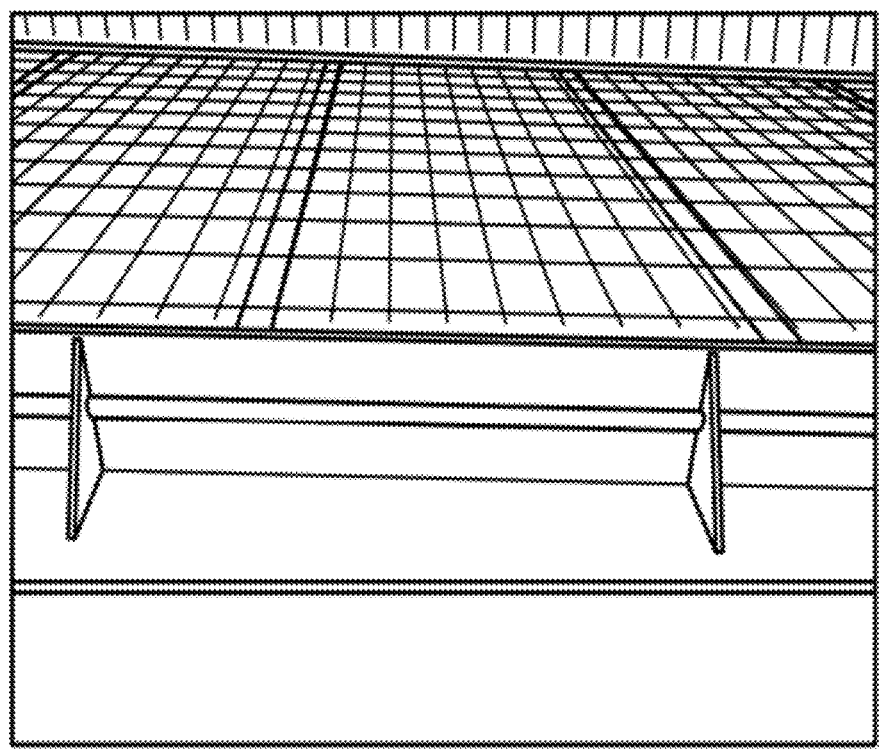
FIG. 27 shows a side wall of the bed, the lower wall of the bed, and the container placed in a hanging relationship above the lower wall of the bed.
Figure 28:
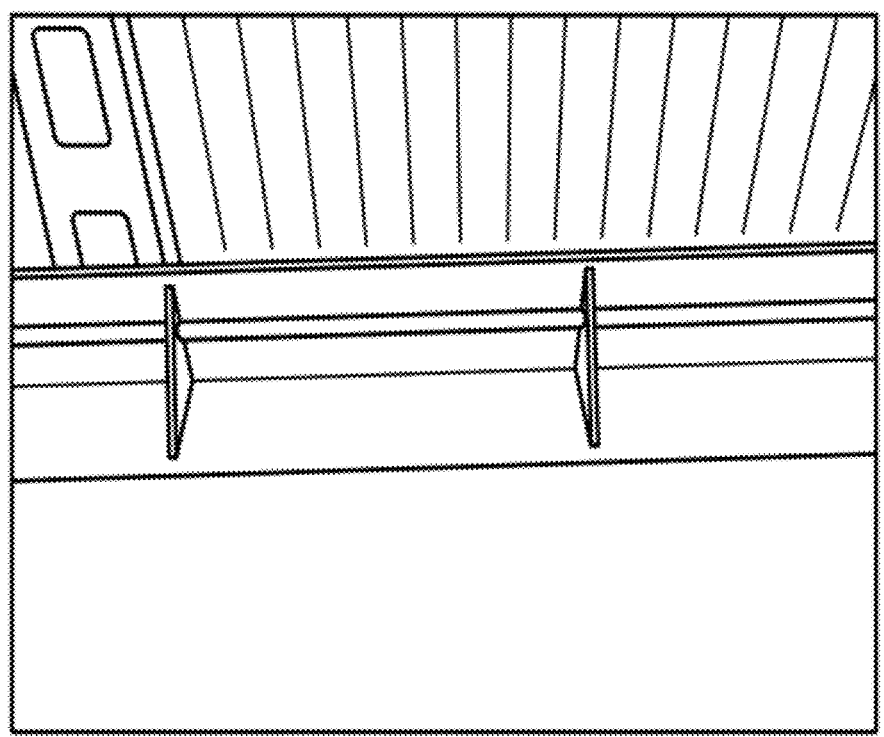
FIG. 28 shows a detailed view of the side wall of the bed, the lower wall of the bed and the container.
Figure 29:
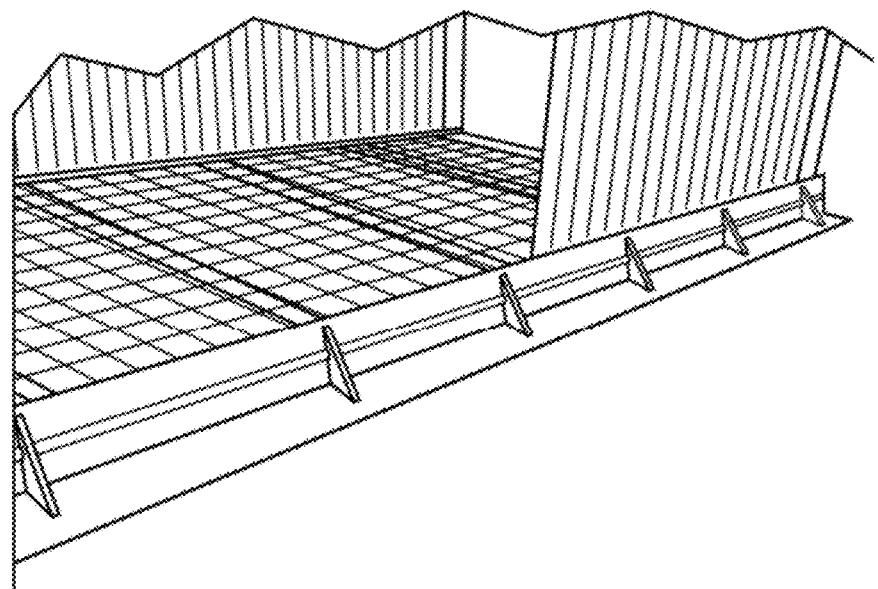
FIG. 29 shows a side view of the side wall of the bed, the lower wall of the bed and the container.
Figure 30:
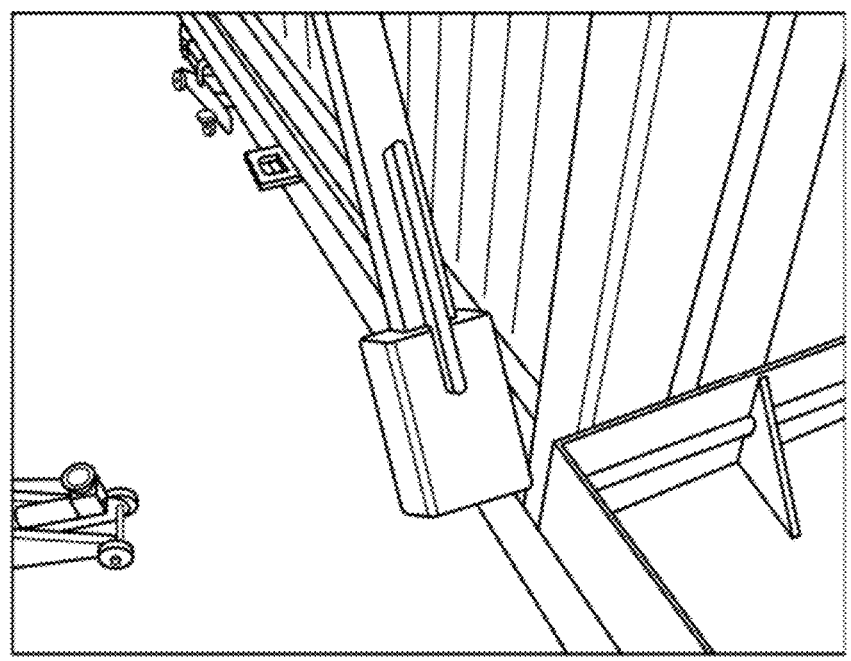
FIG. 30 shows a detailed view of the corner of the container, the bar, the housing of said bar, the side wall of the bed, the front wall of the bed and the lower wall of the bed.

The following description is made for FIGS. 1-30 of the application.

The first embodiment comprises two cranes 20. A first crane 20 is placed in the front end 10 of the container 2 or rebar structure. A second crane 20, similar to the first crane is placed in the back end 12 of the container 2 or rebar structure. Each crane 20 comprises at least one boom 22, preferably two substantially parallel booms, one boom 22 per each side of the front 10 or back 12 end of the container 2, at least one jib 24 per boom, one hoist rope 26 per jib and a jib hook 28 at the end of each hoist rope 26. The hoist rope 26 may be substituted with a long jib hook 28, and therefore is an optional element of the crane system. Each of the substantially parallel booms 22 is mated to a balancing structure 30; each balancing structure comprises one beam (not shown) per boom, each beam being substantially parallel to each other. Each beam is placed in the back part with regards to each boom. The beams are substantially shorter in height than the booms 22. The beams and booms 22 are located in such a manner that a housing 32 is formed between said beams and booms 22. Within said housing 32 of the first or second crane 20 an engine 34 may be placed. The use of the engine 34 is optional, since manual means for rotating the container 2 may be used. Furthermore, the location of the engine 34 may be in other places which are not within this housing 32. In a lower part of the central portion of each of the booms 22, a support 38 is placed; the support is substantially perpendicular to the boom 22. A cross-bar 36 is mated to each boom 22 by means of the supports 36, since said cross bar 36 rests on the supports 38 perpendicular to the booms 22. In a substantially central part of said cross-bar 36 an arm 44 is mated to the cross-bar 36. Also, an opening 40 is found in a substantially central part of the cross-bar 36; the opening 40 needs a determined width, so that the arm 44 fits within.

A bar 42, different to the cross-bar 36, is placed from an upper corner end 124 of the front 10 or back 12 end or wall of the container 2 to a lower opposite corner end 126 of the same front 10 or back 12 end or wall of the container 2 or rebar structure, that is for example, the bar 42 transversely crosses from an upper corner end 124 of the front end or wall 10 of the container to a lower corner end 126 of the front end or wall 10 of the container 2 or rebar structure. Alternately, there may be two bars 42, each bar transversely crossing the container 2 or rebar structure, that is, a first bar 42 transversely crossing from a first upper corner end 124 of the front 10 or back 12 end or wall of the container 2 to a first lower corner end 126 of the front or back end or wall of the container 2 in the opposite corner of that same front wall or back wall of the container 2 or rebar structure and a second bar transversally crossing from a second upper corner end of the container or rebar structure, the second upper corner end being opposite to the first upper corner end 124 of the container or rebar structure, to a second lower corner end of the container 2 or rebar structure, opposite to the first lower corner end 126 of the container or rebar structure. That is, if there are two bars 42, the two bars form an "X" shape. If there are two bars, the first bar 42 may be mated with the second bar. In a substantially central portion of the transversal bar 42, or in the section where the first transversal bar intersects the second transversal bar, an arm 44 is located, said arm 44 has a determined diameter which is less than the width of the opening 40 of the cross-bar 36.

Each end of the transversal bar 42 comprises a support which is formed by at least one wall 46 proximate to the container 2, or preferably a substantially hollow housing 48 having at least one wall 46 which is proximate to the corresponding corner side of the container 2. For purposes of the following specification, the support will be named as housing 48 only. The housing wall 46 proximate to the corner end 124, 126 of the container 2 includes an opening 50 through which a fastener 52, such as a bolt or screw or other types of fasteners known in the art, specifically the body 54 of the fastener is inserted. Containers 2, such as shipping containers, comprise in each of its corners structural beams 128, each of the ends 130 of the structural beams 128 contains twist locks 132 or corner castings which are generally used for locking the containers 2, when stacked, into place or for lifting the containers. The twist locks 132 or corner castings are generally hollow and contain at least one opening 134. Likewise, since rebar structures are generally made with a plurality of longitudinal rods or bars, the plurality of longitudinal rods or bars are generally spaced between them and are surrounded by other rods or bars which hold together the longitudinal rods or bars, hence providing generally hollow spaces. The housing wall 46 proximate to the corner of the container 2 or rebar structure is, when in a fastened position, proximate to the twist locks 132, corner castings or hollow spaces. In fact, the housing 48 of the bar 42 is placed in such a manner that the opening 50 of the wall 46 proximate to the container 2 is co-lineal with the corresponding twist lock 132, corner casting or hollow corner. Therefore, when the body 54 of the fastener 52 is inserted through the opening 50 of the wall 46 proximate to the container 2 or rebar structure, the body 54 of the fastener 52 is also inserted within the opening 134 formed by the twist lock 132 or hollow structure which is co-lineal to the wall 46 of the housing 48. The head 56 of the fastener 52 is placed either within the housing 48 in such a manner that the head 56 abuts with the wall 46 of the housing 48 which is proximate to the container 2 or rebar structure or is placed within the twist lock 132, corner casting or hollow structure so that the head 56 abuts with the wall within the twist lock 132, corner casting or hollow structure which is proximate to the wall 46 of the housing 48. A complementary thread 58, such as a nut, is placed to abut the opposite side of the wall from which the head 56 of the fastener 52 is placed to fasten the fastener 52. Therefore, the bar 42 and the container 2 are fastened together.

Furthermore, at least one jib hook 28 is placed within the side opening of the upper twist lock 132, corner casting or hollow structure; alternately, the hoist rope 26 is fastened to the jib hook 28, that is, the hoist rope 26 is inserted through the opening of the upper twist lock 132, corner casting or hollow structure and is then fastened to the jib hook 28. Preferably the first upper twist lock 132 or corner casting to be fastened to the jib hook 28, is the same upper twist lock 132, corner casting or hollow structure which is co-linear with the housing of the bar 42. Therefore, each jib 24 is fastened to the upper twist locks 132 or corner castings of the container 2 or hollow structure of the rebar. This allows raising and lowering the container 2 or rebar structure. The container 2 or rebar structure needs to be raised for rotation. Specifically, the container or rebar structure needs to be raised so as to rest the arm 44 of the bar 42 in the cross-bar 36, more specifically in the opening 40 provided in said cross-bar, that is, the arm 44 of the bar when rested on the opening 40 of the cross-bar, said arm 44 and opening 40 are co-lineal. When the arm 44 of the bar 42 rests in the opening 40 provided in said cross-bar 36, a gap 136 between the floor and the container or rebar structure is caused, gap which is such, that will allow the container 2 or rebar structure to freely rotate in regards to the floor and more specifically in regards to the bed 14.

A rolling element bearing 60, such as a ball bearing may be optionally placed in such a manner that it surrounds the arm 44 in the substantially central portion of the bar 42. The ball bearing may be preferably a Conrad style ball bearing wherein each of the races, that is an outer race and an inner race, of the bearing are substantially concentric between themselves, and in between the races of the bearing substantially separated balls are placed, wherein a cage allows keeping the balls separated. However, other types of ball bearings may be used, such as a slot-filled, split-raced and caged ball bearings, among others. Other types of rolling element bearings 60 may be placed such as cylindrical rollers, needle rollers, tapered rollers and spherical rollers; therefore, the description to ball bearings should not be exclusive to the same and should be understood that any type of rolling element bearings may be used. The arm 44 mated to the cross-bar 36 between each boom 22 is fastened to the outer race of the rolling element bearing 60, so that the outer race of the rolling element bearing 60 is in a substantially fixed position while the inner race which is placed to abut the arm 44 of the bar 42 is in a substantially rotating position.

Since two cranes 20 with the above disposition are placed, each on one end of the container 2 or rebar structure, that is a first crane 20 in the front end 10 of the container or rebar structure and a second crane 20 in the back end 12 of the container or rebar structure, and given the above disposition, when the arm 44 of the bar 42 is set to rest on the opening 40 of the cross-bar 36, and when the jib hook 28 or the hoist rope 26 is released from the side openings 134 of the twist locks 132, corner castings or hollow structure, the container 2 or rebar structure may be freely rotated, hence the cross-bar 36 serves as a balance beam for the rotation of the container 2 or rebar structure. Therefore, a swinging motion may be conveyed manually or by means of an engine to the container 2 or rebar structure so as to sway the container or rebar structure and eventually cause the container 2 or rebar structure to rotate in an X axis so that different walls 4, 6, 8 may be facing the floor or bed 14, for example from a first wall which is initially facing the floor or bed 14, such as the lower wall 6 to a second wall to be facing the floor or bed 14 after rotation, such as a first side wall 4. The bed 14 is then raised so that the wall 4, 6, 8 facing the floor or the bed 14 of the container 2 or rebar structure is within the walls 18 provided by the bed 14. The container 2 is not rested over the bed 14, that is, the container 2 does not abut the bed 14, rather simply hung by the crane 20 keeping a certain distance between the substantially flat surface 16 of the bed 14 and the container wall 4, 6, 8, more specifically in the case of the containers 2, the corners of the container which are generally protruded with regards to the rest of the container wall 4, 6, 8. Cement or concrete may then be poured to said container wall 4, 6, 8 or rebar side which is proximate to the bed 14.

Optionally, the engine 34 may be connected by means of gears 60 or alternate means, such as sprockets to the arm 44 of the bar 42. This connection may be a direct or indirect connection. The engine 34 may be controlled by means of a rudimentary switch or by means of a computer program. The engine 34 may be powerful enough to convey the torque necessary to rotate the container 2 or rebar structure.

Once all the side walls 4, 6, 8 have faced the floor or bed 14 and the bed 14 has been raised and lowered so that cement or concrete may be poured in the wall 4, 6, 8 facing the floor or bed 14, the jib hooks 28 or the hoist ropes 26 are then re-fastened to the twist locks 132 or the corner castings of the container 2 or hollow structure of the rebar, so as to re-fasten the container 2 or rebar with the crane 20. The container 2 or rebar structure is then raised, the bed 14 is lowered and removed from below the container 2 or rebar structure, so as to unfasten the arm 44 with the cross-bar 36, and lowered into the floor.

Second Embodiment

Figure 31:
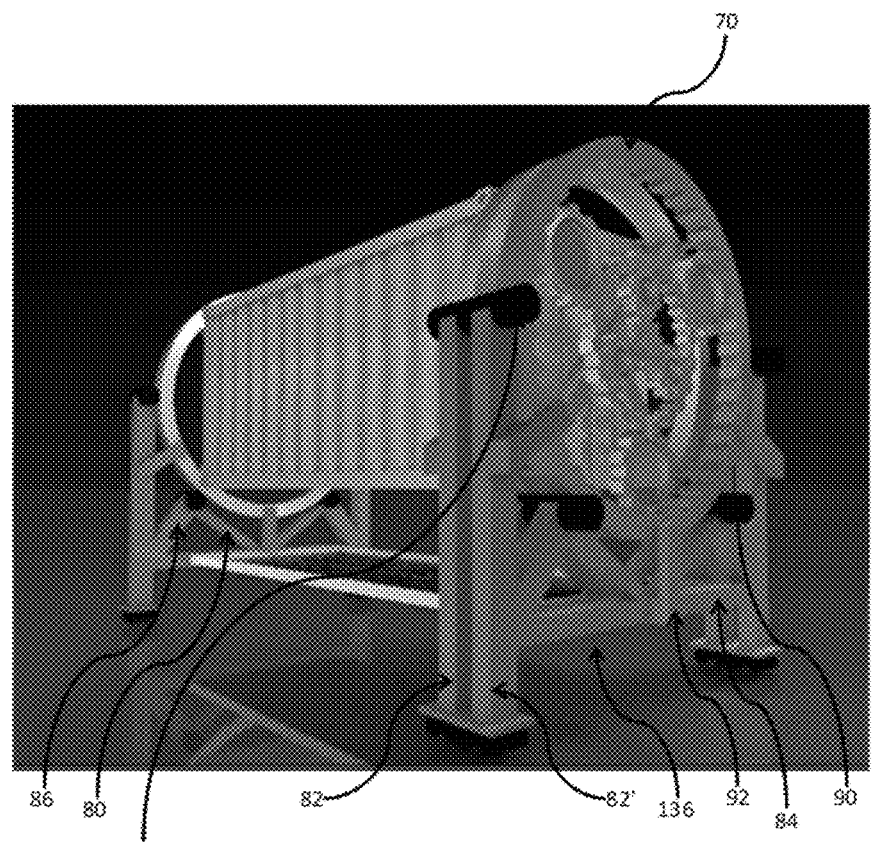
FIG. 31 shows a conventional perspective view of a second embodiment of the container or rebar rotation system, in which planetary gears are shown. The bed is shown in a lowered position.
Figure 32:
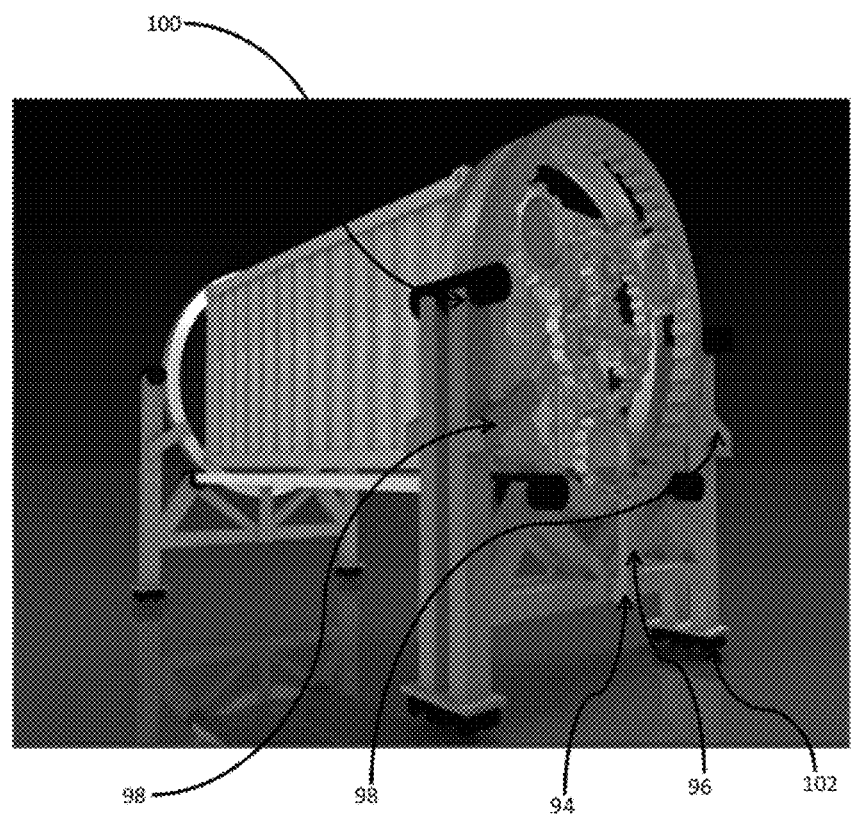
FIG. 32 shows a conventional perspective view of the second embodiment. The bed is shown in a raised position.
Figure 33:
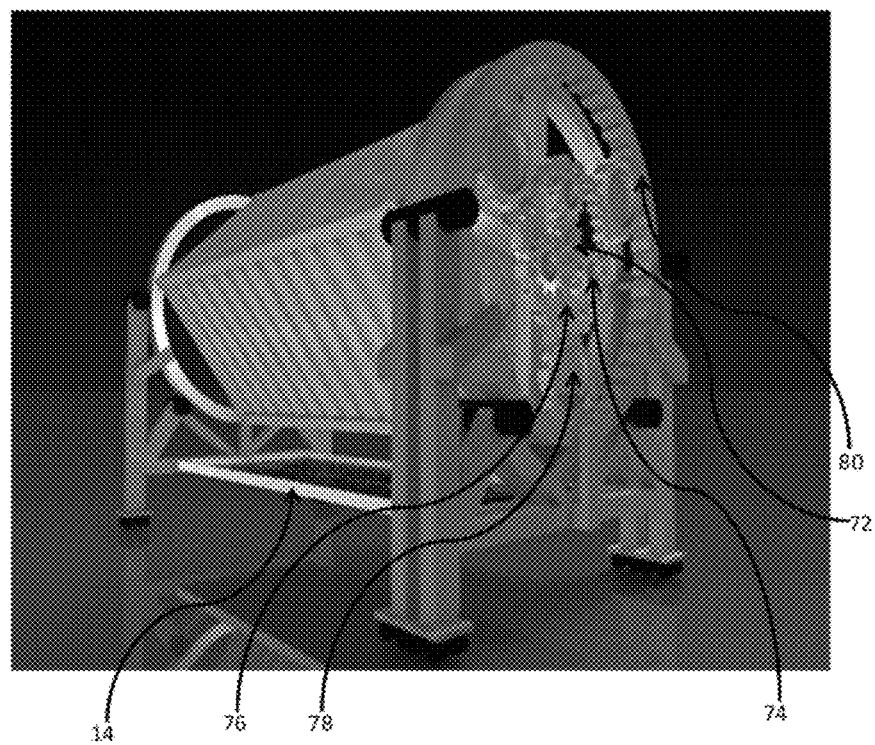
FIG. 33 shows a conventional perspective view of the second embodiment, the bed is shown in a lowered position and the container is shown during rotation.
Figure 34:
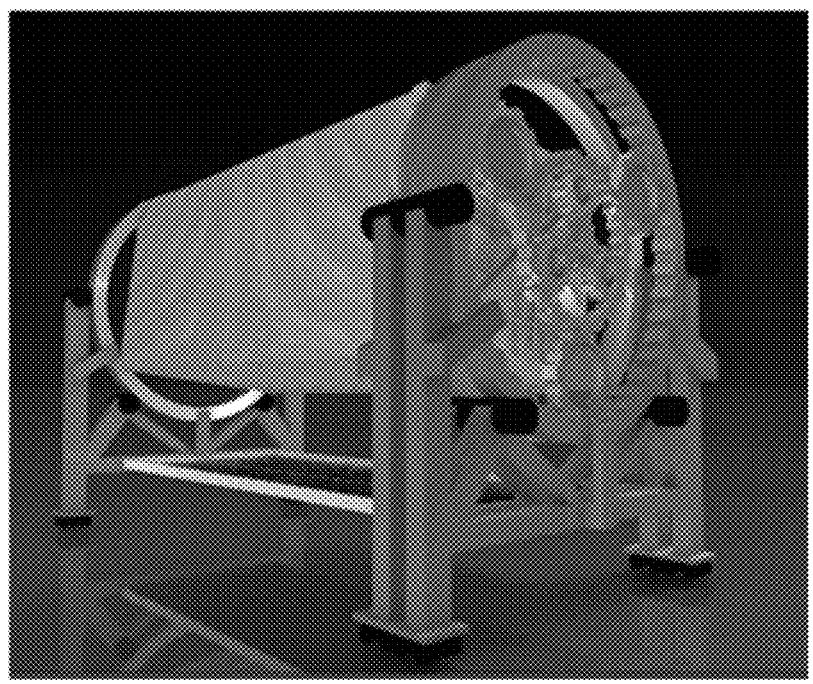
FIG. 34 shows the container after having been rotated by the second embodiment system, wherein the bed is in a lowered position.
Figure 35:
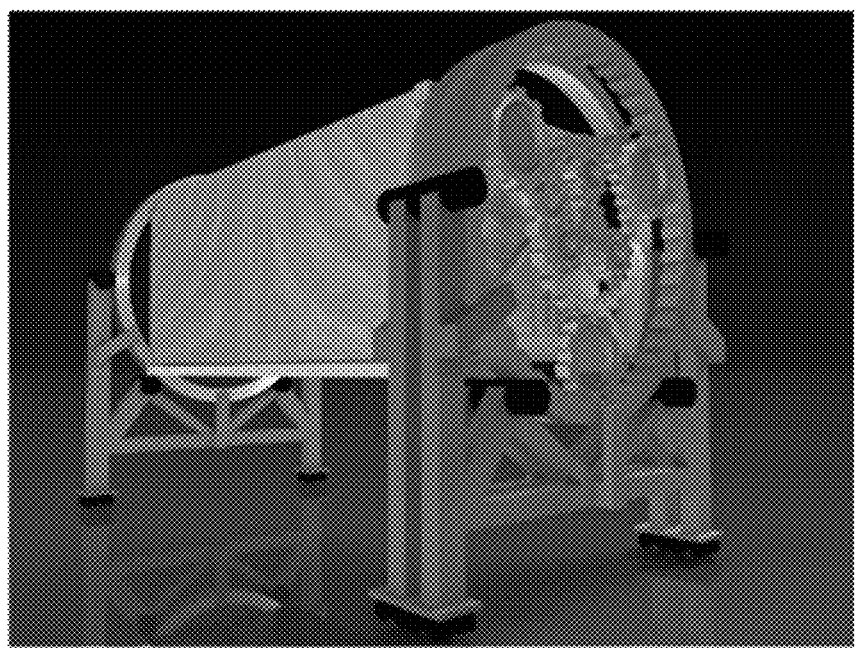
FIG. 35 shows the container after having been rotated by the second embodiment system, wherein the bed is in a raised position.
Figure 36:
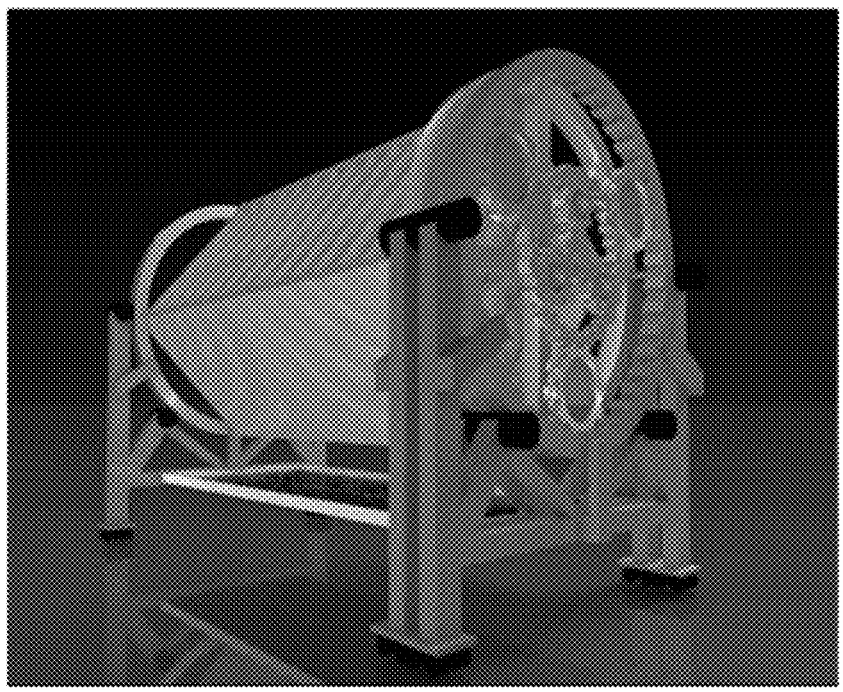
FIG. 36 shows a conventional perspective view of the second embodiment, the bed is shown in a lowered position and the container is shown during rotation.

The following description is made for FIGS. 31-36 of the application.

The second embodiment refers to a planetary gear structure 70, having an optional planet gear carrier (not shown), a first sun gear 72, a first plurality of planet gears 74 around the first sun gear 72, a second sun gear 76 containing the first sun gear 72 and the first plurality of planet gears 74, a second plurality of planet gears 78 around the second sun gear 76 and a fixed ring gear 80 containing all the inner gears 72, 74, 76. The diameter of the fixed ring gear 80 is preferably greater than the width and height of the container 2.

At least one boom 82 per each end corner of the container 2 is placed, the booms 82 being specifically placed facing the corners in the front end 10 and the back end 12 of the container 2. Two booms 82, 82' per each corner of the container 2 may be provided, wherein each of the booms 82, 82' in each corner are substantially parallel one to the other, and are placed one in front of the other, with regards to the length of the container 2. Each of the booms 82 belonging to a specific end of the container 2, that is to the front end 10 or the back end 12 of the container, comprising a first connecting bar 84 which is placed below the planet gear structure 70, wherein the connecting bar 84 connects a first boom 82 with a second boom 82, and hence the connecting bar 84 is substantially perpendicular to the connected booms 82.

In the intersection between the boom 82 and the connecting bar 84, a first supporting bar 86 is placed, wherein the first supporting bar 86 has an upward direction which is between the connecting bar 84 and the boom 82, so that the angle between the first supporting bar 86 and the boom 82 or the connecting bar 84 is an acute angle in both cases. A second supporting bar 88 is provided, from the end distant to the intersection between the first supporting bar 86, the boom 82 and the connecting bar 84 of the first supporting bar 86 to a substantially central part of the connecting bar 84. In the upper part of the intersection between the first supporting bar 86 and a second supporting bar 88, a tangent of the circumference of the ring gear 80 is supported. At least two supporting structures with the first supporting bar 86 and the second supporting bar 88 are provided per each connecting bar 84, such that the second supporting structure is proximate to the second boom 82 in the other side corner of the front end 10 or the back end 12 of the container 2. Therefore, the second supporting structure supports a second tangent of the circumference of the ring gear 80. Preferably, in the intersection between each first supporting bar 86 and the second supporting bar 88 an elastomer 90 is provided so that a certain viscoelasticity is provided when the planetary ring structure 70, and more importantly when the container 2 is hung to the planetary ring structure 70. That is, the elastomer 90 provided in the supporting structures abuts with the tangent of the circumference of the ring gear 80.

The upper part 100 of the boom 82 reaches at least half the height of the ring gear 80. The upper part of the boom 82 may comprise an elastomer 90, which abuts with a substantially higher tangent of the circumference of the ring gear 80 in comparison to the tangents in contact with the supporting structures.

Furthermore, a first fixed connecting bar 92 between the connecting bar 84 and the lower part of the ring gear 80 is provided, the fixed connecting bar 92 connects a substantially central part of the connecting bar 84 and an outwardly facing lower part of the circumference of the ring gear 80. For this connection, the fixed connecting bar 92 contains a first part 94 which is a substantially perpendicular part to the connecting bar 84 and which has an outwardly direction and a second part 96 which has an upwardly direction from the connecting bar 84 and is connected to the outwardly facing lower part of the circumference of the ring gear 80. Two first fixed connecting bars 92 may be provided per each connecting bar 84, wherein the first fixed connecting bar 92 has an outwardly facing direction and wherein the second fixed connecting bar has an inwardly facing direction. Therefore, if two fixed bars are provided the planetary gear structure 70 may be placed between the two fixed bars, so as to fix the planetary gear structure 70 with the connecting bar 84. A second fixed connecting bar 98 is provided, connecting the boom 82 to the outwardly facing part of the circumference of the ring gear 80. Specifically, the second fixed connecting bar is between the supporting structure and the upper part 100 of the boom 82. Two second fixed connecting bars 98 may be provided, wherein the a first second fixed connecting part is outward with regards to the container 2 and the second fixed connecting part is inward with regards to the container 2. Therefore, if two fixed bars are provided, the planetary gear structure 70 may be placed between the two fixed bars, so as to fix the planetary gear structure 70 with the booms 82. The fixed connecting parts 92, 98 may either abut the outer or inner surface of the circumference of the ring gear 82 or may be welded to the outer or inner surface of the circumference of the ring gear 82.

A bar 42, such as the above disclosed for the first embodiment, with a similar disposition than the bar 42 for the first embodiment is used in the second embodiment. All the features of the bar 42 in the second embodiment are the same than the features of the bar 42 of the first embodiment except for the following feature. In a substantially central portion of the transversal bar 42, or in the section where the first transversal bar intersects the second transversal bar, an arm 44 is located, said arm 44 has a determined diameter which is less than the diameter of the central opening of the first sun gear 72, so that the arm 44 meshes with the central opening of the first sun gear 72. For the above, the outer part of the arm 44 may be provided with meshes, as well as the inner part of the opening in the first sun gear 72. Additionally, the inner part of the arm 44 may be hollow and provided with meshes.

An drive shaft (not shown) with outer meshes, which may be connected to the inner part of the art 77, may provide the output torque to rotate the planetary gear structure 70 and consequently the container 2. The drive shaft may be connected to an engine 34 in manners known in the art.

Caster wheels 102 may be provided for each of the booms 82, so that booms 82 to be placed in each of the front 10 or back 12 ends of the container 2 may be moved, as well as the planetary gear structure 70 supported by the booms 82.

The bed 14 may be raised and lowered by means of jacks 122 as per the first embodiment. At least one groove (not shown) may be provided in each second part 96 of the inner first fixed connecting bars 92, the bed 14 being connected to the groove by means of one extruding arm of the bed 14, hence the bed may be raised and lowered by a single jack 122 or by other means for raising and lowering the bed 14 known in the art, in such a manner that the bed 14 will rise evenly despite the fact that it is raised by a single jack 122.

Third Embodiment

Figure 37:
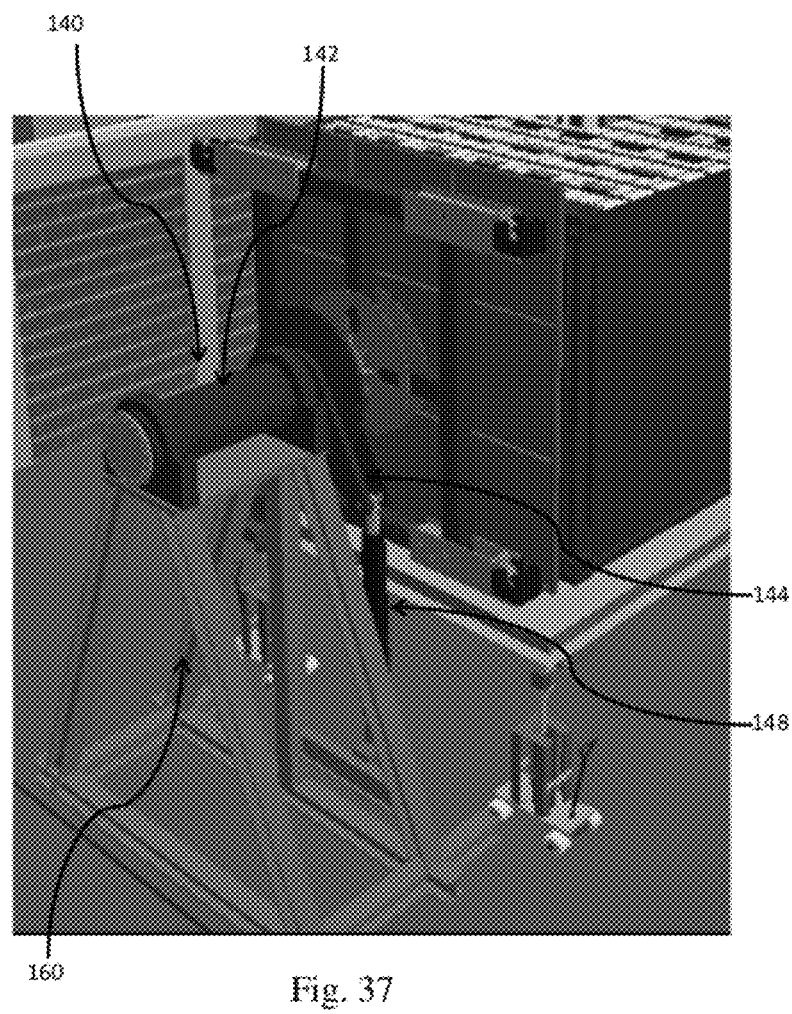
FIG. 37 shows a conventional perspective view of a third embodiment, in which a piston is connected to a rotating machine, the bed is shown in a raised position.
Figure 38:
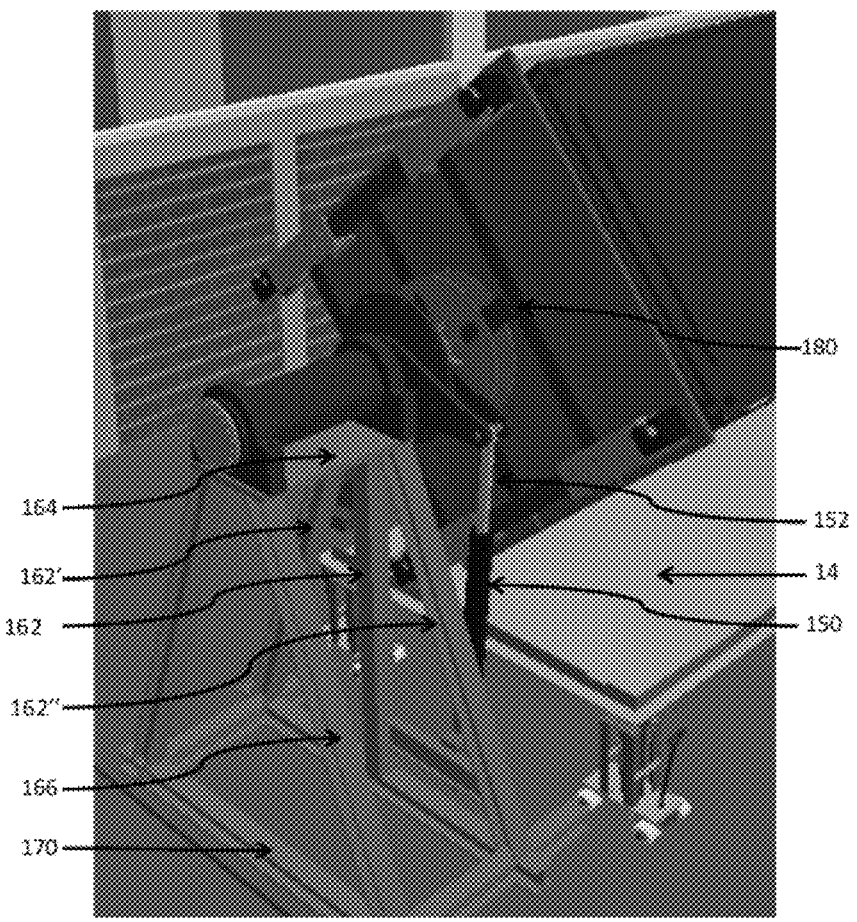
FIG. 38 shows a conventional perspective view of the third embodiment, wherein the bed is shown in a lowered position and the container is shown during rotation.
Figure 39:
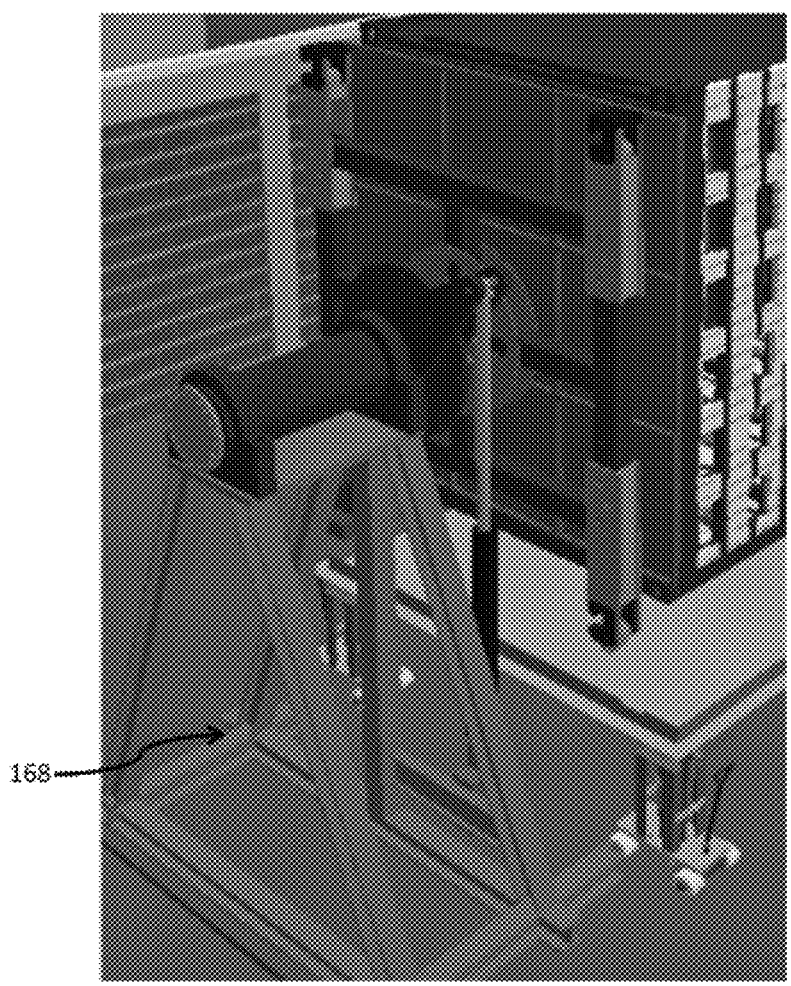
FIG. 39 shows a conventional perspective view of the third embodiment, wherein the bed is shown in a lowered position and the container has now been rotated.
Figure 40:
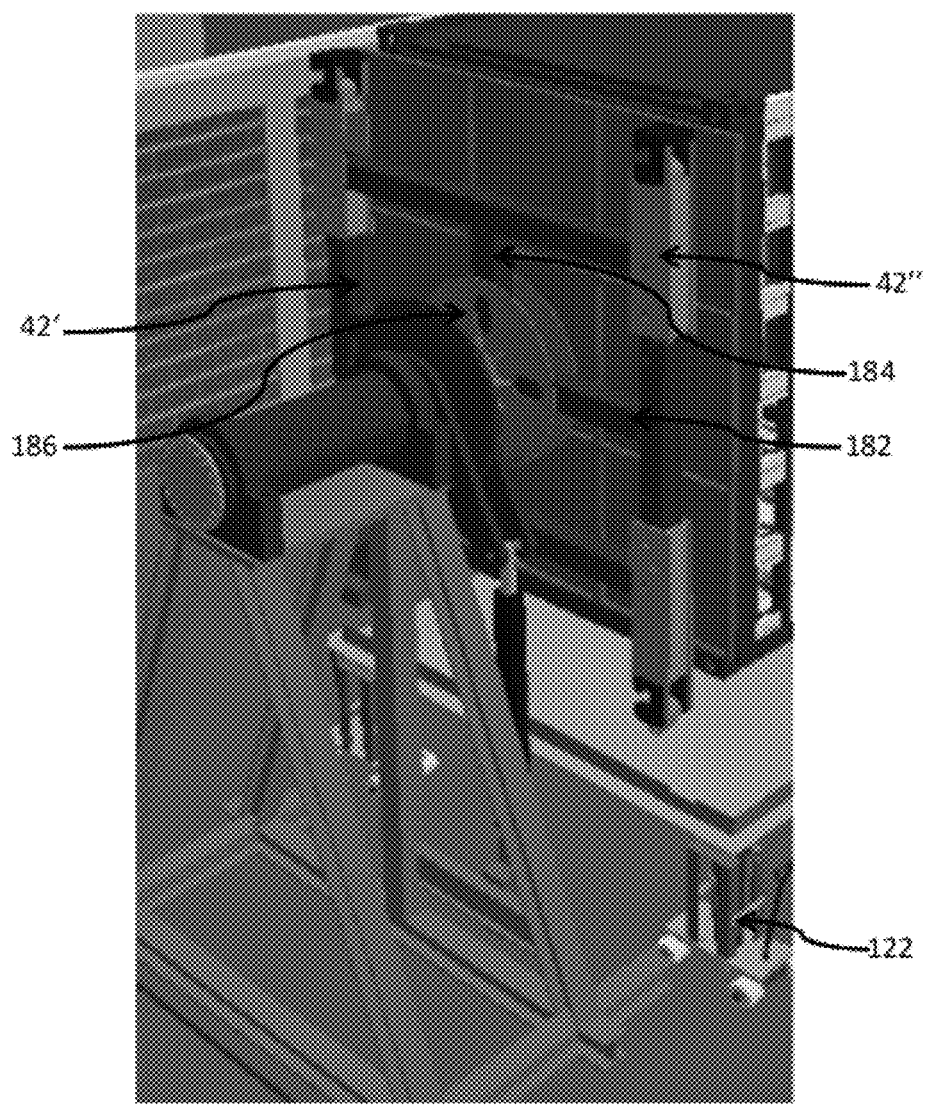
FIG. 40 shows a conventional perspective view of the third embodiment, wherein the bed is shown in a lowered position and the piston is in a resting position.
Figure 41:
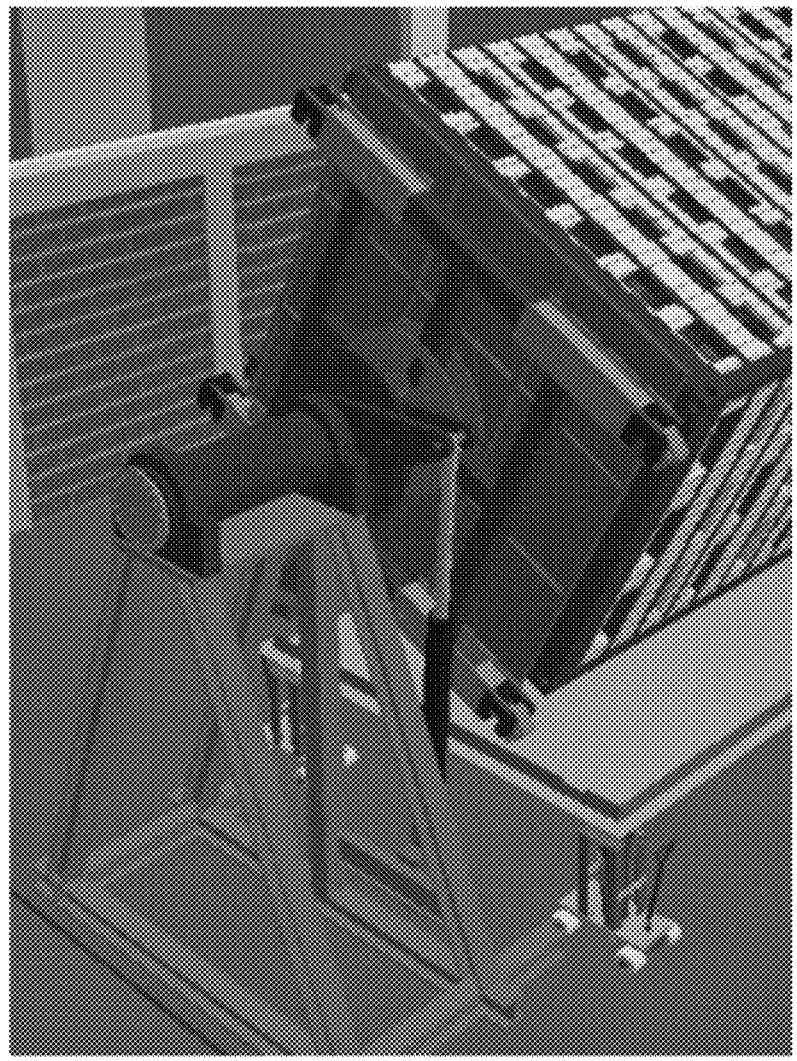
FIG. 41 shows a conventional perspective view of the third embodiment, wherein the bed is shown in a lowered position and the container is shown during rotation.
Figure 42:
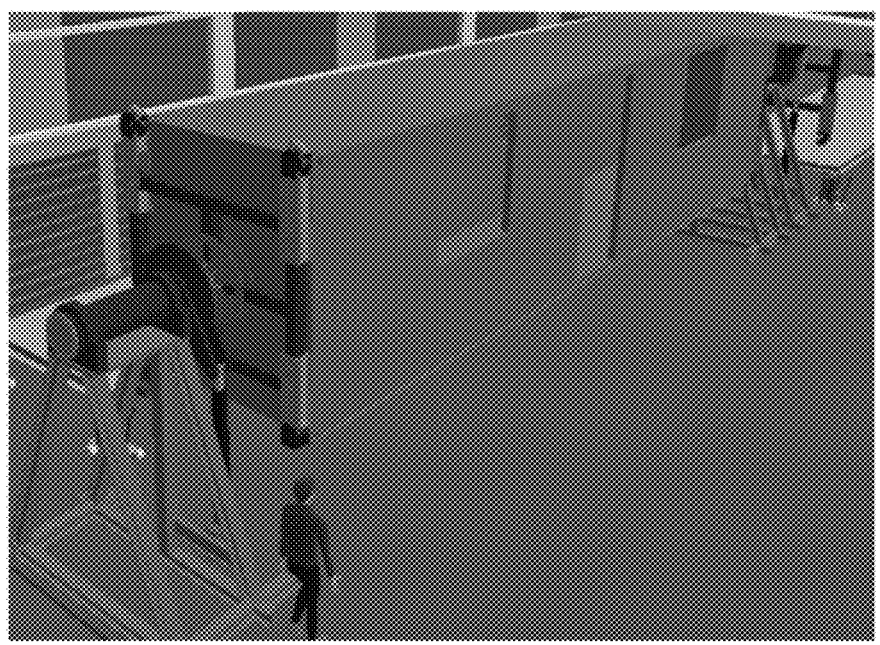
FIG. 42 shows a conventional perspective view of the third embodiment, wherein the container is now ready to be removed from the rotating system and the bed has been removed.
Figure 43:
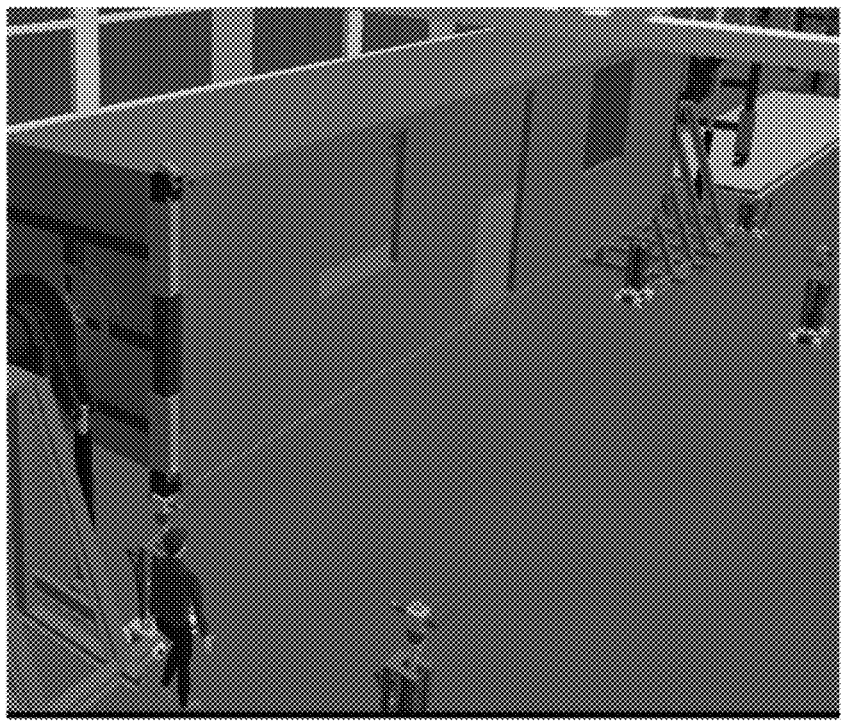
FIG. 43 shows a conventional perspective view wherein jacks are being placed underneath the container so as to move the container from the rotating system.

The following description is made for FIGS. 37-43 of the application.

The third embodiment relates to a piston machine structure 140. The piston machine structure 140 comprises, in part, a shaft housing 142, a drive shaft (not shown) within said shaft housing and two protuberances 144, each protuberance with an opening in the two ends of the protuberances. Furthermore, the piston machine structure 140 further comprises, at least in part, a piston structure 148 with a cylinder 150 and a piston 152.

A boom structure 160 supports the piston machine structure 140, the boom structure comprising at least three booms 162, a supporting surface 164 to support the piston machine structure and at least two back beams 166, substantially parallel to at lest two of the booms, thus a housing 168 is formed between the booms and the beams.

Specifically, the boom structure 160 for the third embodiment includes three booms 162, a central boom and two adjacent booms, wherein the central boom 162 is substantially upwardly straight and wherein the adjacent booms 162', 162" are slanted with regards to the central boom 162, in such a manner that the adjacent booms 162', 162" are tapered, and wherein in the upper part of the boom structure 160 the booms are substantially closer than in the lower part of the boom structure 160. The booms 162 are placed proximate to where the container 2 or rebar structure is placed. Distant from where the container 2 or rebar structure is placed, that is, in a back part in regards to the container 2 or rebar structure and the booms 162, beams 166 are placed in a substantially parallel manner to the adjacent booms 162', 162"". In the upper part of the booms 162 and beams 166 a supporting surface 164 is placed, which is a substantially even surface since the booms and beams have the same height. In the lower part of the booms and beams a frame 170 may be placed to hold together all of the lower parts of the beams and booms.

Part of the piston machine structure 140 rests and is fastened to the supporting surface 164 of the boom structure 160. Specifically, the shaft housing 142 rests and is fastened to the supporting surface 164 of the boom structure 160. The shaft housing 142 houses at least part of the drive shaft. The drive shaft has the sufficient length to be placed within the shaft housing 142 and protrude from the shaft housing towards the container 2 or rebar structure, intersecting the first protuberance 144' by means of a first opening of the first protuberance, the rotating cylindric portion 146 by means of the opening in said portion and the second protuberance 144" by means of a first opening of the second protuberance. Furthermore, the drive shaft has the sufficient length to be fastened to the bar 42.

In the end of the first and second protuberances 144, distant to said intersection between the drive shaft and the protuberances 144, a second opening is provided. At least part of the piston 152 is within said cylinder 150. The end of the piston 152 distant to the cylinder 150 comprises protuberances, wherein the protuberances of the piston 152 fit within the second openings provided in each of the protuberances 144. Therefore, the piston 152 and the protuberances 144 are fastened together. In a resting position, the piston 152 is in a retracted position within the cylinder 150 and the protuberances 144, given the retracted position of the piston 152, have a downwardly facing orientation. In the end of the first and second protuberances, proximate to the intersection between the drive shaft and the protuberances 144, a first opening is provided. An arm 44 is fitted within said first opening, wherein the arm 44 is in a ratchet relationship with the protuberances 144 and the drive shaft. The drive shaft may be fitted within the arm 44 and as per the previous embodiments, the inner part of the arm 44 may be hollow and provided with meshes, so as to provide such a ratchet. That is, the protuberances 144 and the drive shaft rotate in both directions, while the arm 44 is able to rotate in a single direction. When the piston 152 is extracted from the cylinder 150, the piston pushes the protuberances 144 to an upwardly facing position, rotating the protuberances, the drive shaft and the arm 44 as well as the bar 42, and consequently the container 2 or rebar. When the piston 152 is retracted into the cylinder 150, the piston pulls the protuberances 144 to a downwardly facing position, rotating the protuberances and the drive shaft only. Gears (not shown) may be used to increase the rotation. That is, while the protuberances 144 may rotate less than 90°, the container or rebar is rotated the full 90°.

While a bar 42, such as the above disclosed for the first or second embodiments, with a similar disposition than the bar 42 for the first embodiment or the second embodiments may be used, however, as seen in the figures, the bar 42 shown for the present embodiment is different. Specifically, a bar structure 180 of the present embodiment uses two different bars 42, a first bar 42' extending from an upper end first corner of the container 2 or rebar structure to a lower end first corner of the container or rebar structure, while a second bar 42" extends from an upper end second corner of the container or rebar structure to a lower end second corner of the container or rebar structure. Fastening means, such as those of the first and second embodiment, for fastening the bars 42 to the container 2 or rebar structure are also provided for this embodiment. Therefore, the bars 42', 42" are parallel and run proximate to the edge of the container 2 or rebar structure. Perpendicular to the bars 42', 42', a plurality of connecting bars 182 are provided, which fasten the bars 42', 42"". A substantially central connecting bar 182 is needed, in which the arm 44 is provided. A cross-bar 184 from an end connecting bar 182 to the opposite end connecting bar may be provided, wherein the cross-bar is substantially centrally placed so that the arm 44 may also be provided from said cross-bar 184. Fastening discs 186 may be welded to the cross-bar 184 and to the central connecting bar 182, wherein the fastening discs may be used to secure the fastening cross-bar and the connecting bar.

Alterations to the structure described in the present, shall be able to be foreseen by those with expertise in the field. However, it must be understood, that the present description is related with the preferred embodiments of the invention, which is solely for illustrative purposes, and must not be construed as a limitation of the invention. All modifications which do not depart from the spirit of the invention are included within the body of the attached claims.

What is claimed is:

1. A method of rotating a metallic structure for a habitable structure comprising:
   providing a metallic structure comprising a front wall, a back wall, side walls, an upper wall and a lower wall;
   providing a piston machine structure comprising a shaft housing, a drive shaft within said shaft housing, a first protuberance and a second protuberance, and a piston structure, wherein a first opening is provided proximate to an intersection between the drive shaft and the protuberances;
   providing a bar structure comprising a first bar extending from an upper end first corner of the metallic structure to a lower end first corner of the metallic structure and a second bar extending from an upper end second corner of the metallic structure to a lower end second corner of the metallic structure, a plurality of connecting bars perpendicular to the first and second bars, and an arm coupled to a substantially central connecting bar;
   fastening a front wall and a back wall of the metallic structure to the bar structure;
   lifting the metallic structure to provide a gap between a downwardly facing wall of the metallic structure and a floor or a bed under said metallic structure, wherein the bed has a substantially flat surface having an area greater than the upper, lower or side walls of the metallic structure;
   raising the bed so that the bed is proximate to the downwardly facing wall of the metallic structure, pouring cement or concrete over the downwardly facing wall of the metallic structure and lowering the bed so that the bed is distant to the downwardly facing wall of the metallic structure and so that the metallic structure may be rotated; and
   rotating the metallic structure by means of the piston structure and the bar structure, wherein the arm in the bar structure is fitted in the first opening of the piston structure so that when rotated, side walls, an upper wall or a lower wall of the metallic structure, face downwardly towards the floor or the bed.

2. The method of claim 1, wherein first and second bars are fastened by means of fasteners through a wall with an opening of the first and second bars, the wall with an opening being proximate to a twist-lock, corner casting or hollow structure of the metallic structure.

3. The method of claim 2, wherein the first and second bars further comprise a housing in each end of the first and second bars in which the wall with the opening, which is to be fastened to the twist-locks, corner castings or hollow structures of the metallic structure, is contained.

4. The method of claim 1, wherein the arm is substantially hollow and comprises meshes in its outer and inner surfaces, and wherein
   a structure to support the piston machine structure by means of a boom structure is provided; and
   wherein the arm is in a ratchet relationship with the piston machine structure.

5. The method of claim 1, wherein the first and second bars are parallel and run proximate to the edge of an metallic structure, and the connecting bars fasten the bars.

6. The method of claim 1, wherein a cross-bar extending from the substantially central connecting bar to an opposite connecting bar is provided, wherein the cross-bar is substantially centrally placed so that the arm is provided from said cross-bar.

7. The method of claim 6, wherein at least one fastening disc is welded to the cross-bar and to the substantially central connecting bar to fasten the cross-bar and the connecting bar.

8. The method of claim 1, wherein the piston structure comprises a cylinder and a piston.

9. The method of claim 8, wherein the piston when extracted from the cylinder pushes the first and second protuberances to an upwardly facing position, rotating the protuberances, the drive shaft, the arm, the first and second bars and the metallic structure.

10. A system for rotating a metallic structure so that at least one of the side walls, an upper wall or a lower wall of a metallic structure, face downwardly when the metallic structure is rotated, the system comprising:
    at least one boom structure placed proximate to where the metallic structure is placed, the boom structure comprising at least three booms, a supporting surface to support a piston machine structure and at least two back beams, substantially parallel to at least two of the booms forming a housing between the booms and the beams;
    the piston machine structure comprising a shaft housing, a drive shaft within said shaft housing, a first and a second protuberance and a piston structure comprising a cylinder and a piston, wherein a first opening is provided proximate to an intersection between the drive shaft and the protuberances;

providing a bar structure fastened to each of the front wall and back wall of the metallic structure, each bar structure comprising a first bar extending from an upper end first corner of the metallic structure to a lower end first corner of the metallic structure and a second bar extending from an upper end second corner of the metallic structure to a lower end second corner of the metallic structure, a plurality of connecting bars perpendicular to the first and second bars, and an arm in a substantially central connecting bar;

wherein part of the piston machine structure rests and is fastened to the at least one boom structure;

wherein the arm is fitted in the first opening of the piston structure, and wherein the arm is in a ratchet relationship with the piston machine structure; and a bed provided under said metallic structure; wherein the bed has a substantially flat surface having an area greater than the upper, lower or side walls of the metallic structure; and wherein the bed is capable of being raised to be proximate to the downwardly facing wall of the metallic structure and lowered to be distant to the downwardly facing wall of the metallic structure.

11. The system of claim 10, wherein the system further comprises fasteners which fasten the first and second bars through a wall with an opening of the first and second bars, the wall with an opening being proximate to a twist-lock, corner casting or hollow structure of the metallic structure.

12. The system of claim 11, wherein the first and second bars further comprise a housing at each end of the first and second bars in which the wall with the opening, which is to be fastened to the twist-locks, corner castings or hollow structures of the metallic structure, is contained.

13. The system of claim 10, wherein the arm is substantially hollow and comprises meshes in its outer and inner surfaces.

14. The system of claim 10, wherein the metallic structure is a shipping container.

\* \* \* \* \*